US012691897B2

(12) United States Patent
Wang et al.

(10) Patent No.: US 12,691,897 B2
(45) Date of Patent: Jul. 28, 2026

(54) TRAJECTORY PLANNING IN A THREE-DIMENSIONAL SEARCH SPACE WITH A SPACE-TIME ARTIFICIAL POTENTIAL FIELD

(71) Applicant: Aptiv Technologies AG, Schaffhausen (CH)

(72) Inventors: Qian Wang, Westfield, IN (US); Rui Chen, Bloomfield Hills, MI (US)

(73) Assignee: Aptiv Technologies AG, Schaffhausen (CH)

( * ) Notice: Subject to any disclaimer, the term of this patent is extended or adjusted under 35 U.S.C. 154(b) by 225 days.

(21) Appl. No.: 18/359,852

(22) Filed: Jul. 26, 2023

(65) Prior Publication Data

US 2025/0033661 A1 Jan. 30, 2025

(51) Int. Cl.
*B60W 60/00* (2020.01)
*B60W 30/06* (2006.01)
*B60W 30/08* (2012.01)

(52) U.S. Cl.
CPC .......... *B60W 60/001* (2020.02); *B60W 30/06* (2013.01); *B60W 30/08* (2013.01);
(Continued)

(58) Field of Classification Search
CPC .... B60W 60/001; B60W 30/06; B60W 30/08; B60W 2520/00; B60W 2554/80; B60W 2556/00; B62D 15/0285
See application file for complete search history.

(56) References Cited

U.S. PATENT DOCUMENTS

2015/0120138 A1* 4/2015 Zeng ..................... G01S 13/931
701/41
2018/0251126 A1* 9/2018 Linscott ............... G05D 1/0055
(Continued)

FOREIGN PATENT DOCUMENTS

DE 102015215929 A1 2/2017

OTHER PUBLICATIONS

Fan, et al., "Baidu Apollo EM Motion Planner", Jul. 20, 2018, 15 pages.
(Continued)

*Primary Examiner* — Abby Lin
*Assistant Examiner* — Danielle M Jackson
(74) *Attorney, Agent, or Firm* — Harness, Dickey & Pierce, PLC

(57) ABSTRACT

This document describes trajectory planning in a three-dimensional (3D) search space with a space-time artificial potential field. An example system includes a processor that obtains an initial pose, a goal pose, and an obstacle map for an environment. The processor uses a parking trajectory algorithm to determine a trajectory by searching in a space-time artificial potential field. The trajectory includes a series of 3D waypoints, including two-dimensional (2D) positional coordinates and time coordinates, to navigate from the initial pose towards the goal pose. Operation of the host vehicle is then controlled to maneuver along the trajectory using an assisted-driving or autonomous-driving system. In this way, path searching is performed in the entire 3D search space rather than iterating between two 2D search planes. This allows motion planning for autonomous parking, especially with static and dynamic objects present, to determine an optimal trajectory in a single iteration.

21 Claims, 16 Drawing Sheets

(52) U.S. Cl.
   CPC ..... *B60W 2520/00* (2013.01); *B60W 2554/80*
      (2020.02); *B60W 2556/00* (2020.02)

(56) References Cited

U.S. PATENT DOCUMENTS

| | | | | |
|---|---|---|---|---|
| 2020/0117211 A1* | 4/2020 | Paglieroni | ............ | G05D 1/0274 |
| 2021/0114617 A1* | 4/2021 | Phillips | .............. | G01C 21/3453 |
| 2021/0300357 A1* | 9/2021 | Sivakumar | ............. | G08G 1/167 |
| 2022/0009552 A1* | 1/2022 | Sakai | ................... | G06V 20/586 |
| 2022/0080964 A1* | 3/2022 | Fukushige | ............ | B60W 10/20 |
| 2022/0176951 A1* | 6/2022 | Sorin | ................ | B60W 60/0027 |
| 2022/0203967 A1 | 6/2022 | Park et al. | | |
| 2022/0258343 A1* | 8/2022 | Machida | .............. | G05D 1/0297 |
| 2022/0374021 A1* | 11/2022 | Takahashi | ............ | G05D 1/0219 |
| 2024/0199083 A1* | 6/2024 | Chang | .............. | B60W 50/0097 |
| 2024/0208493 A1* | 6/2024 | He | ......................... | G05D 1/633 |
| 2024/0316773 A1* | 9/2024 | Song | ..................... | B25J 9/1666 |

OTHER PUBLICATIONS

Extended European Search Report regarding Application No. 23207894.
9, mailed Apr. 23, 2024.
Cowlagi R V et al: "Multiresolution path 5-9 planning with wave-
lets: A local replanning approach", American Control Conference,
2008, IEEE, Piscataway, NJ, USA, Jun. 11, 2008 (Jun. 11, 2008),
pp. 1220-1225, XP031296223, ISBN: 978-1-4244-2078-0 p. 1, col.
1, paragraph 2.

* cited by examiner 700-1

702-1

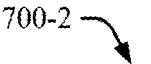
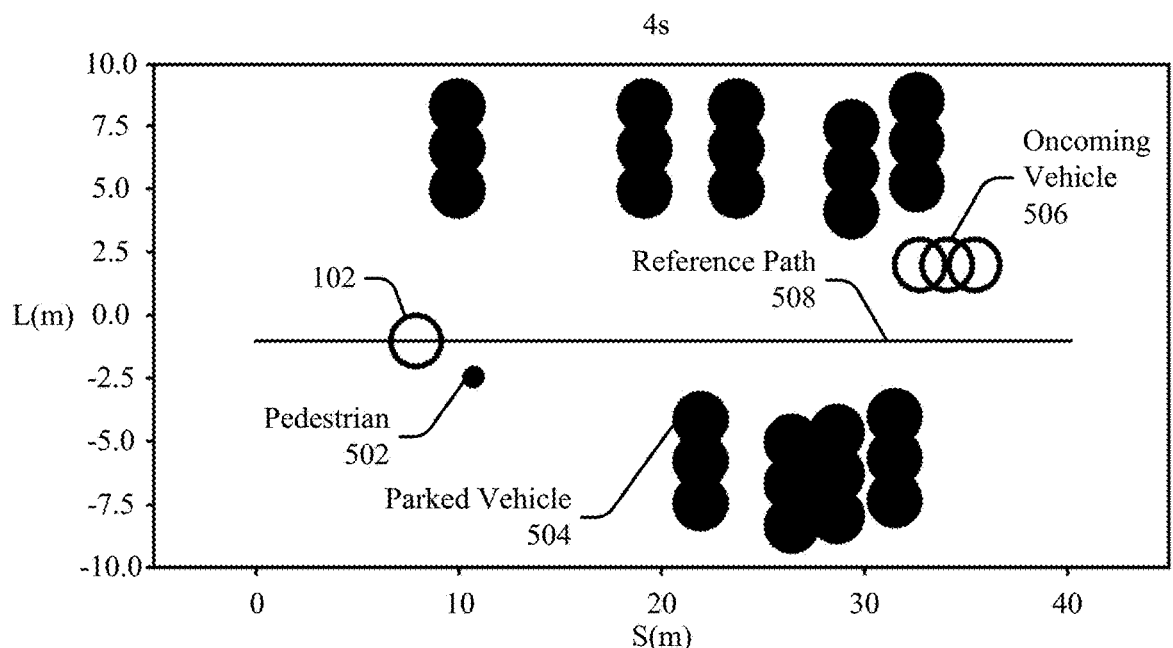
*FIG. 7-3*
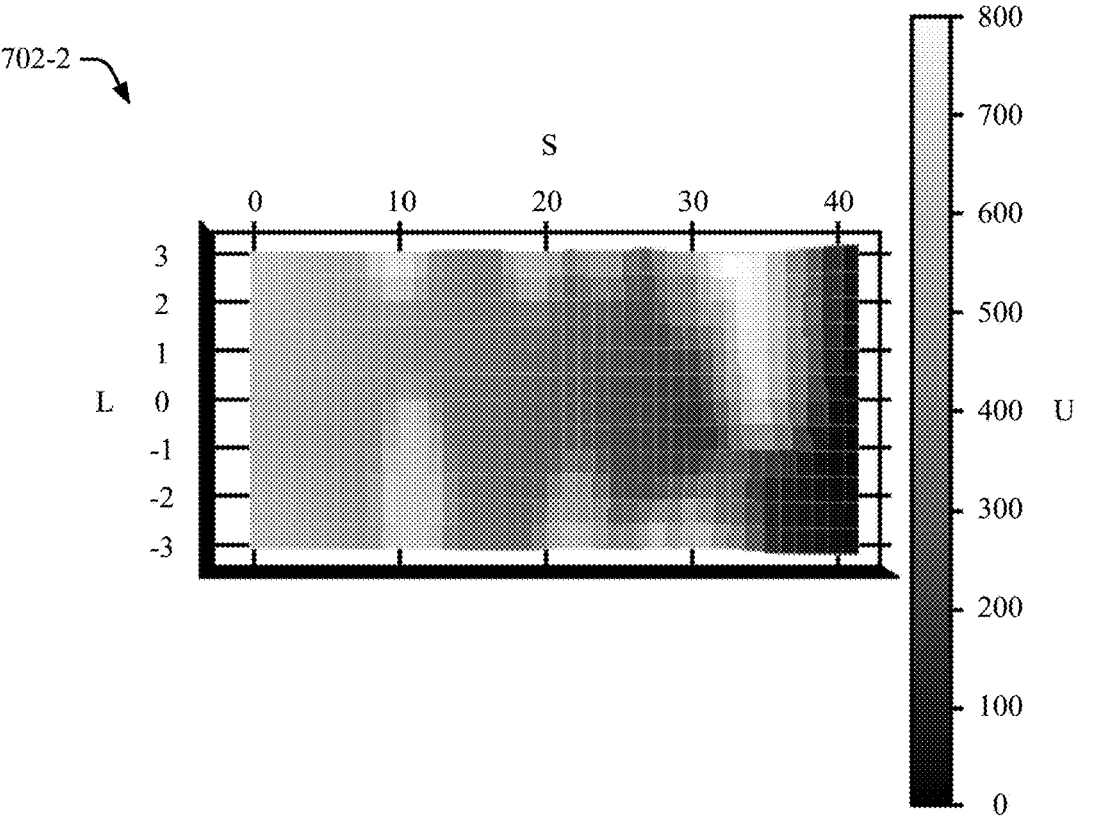
*FIG. 7-4*

700-4

11s

Parked Vehicle
504

Reference
Path
508

102

Oncoming Vehicle
506

Pedestrian
502

702-4

S

L

U 700-5

702-5

700-6

702-6

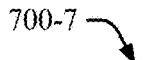
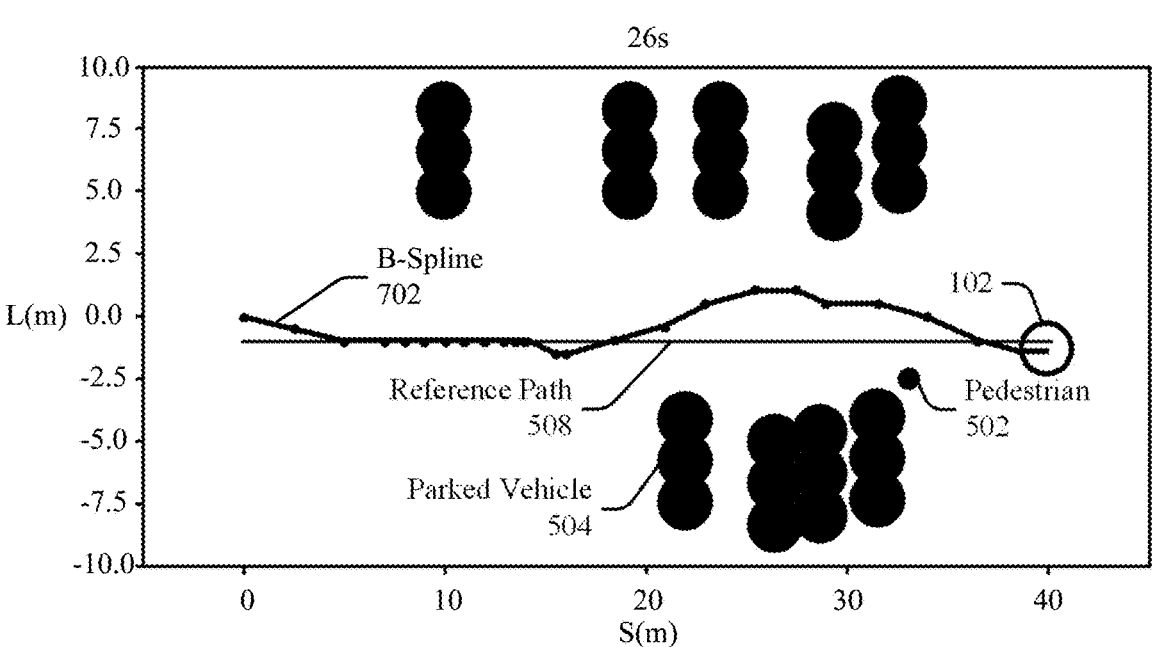
*FIG. 7-13*
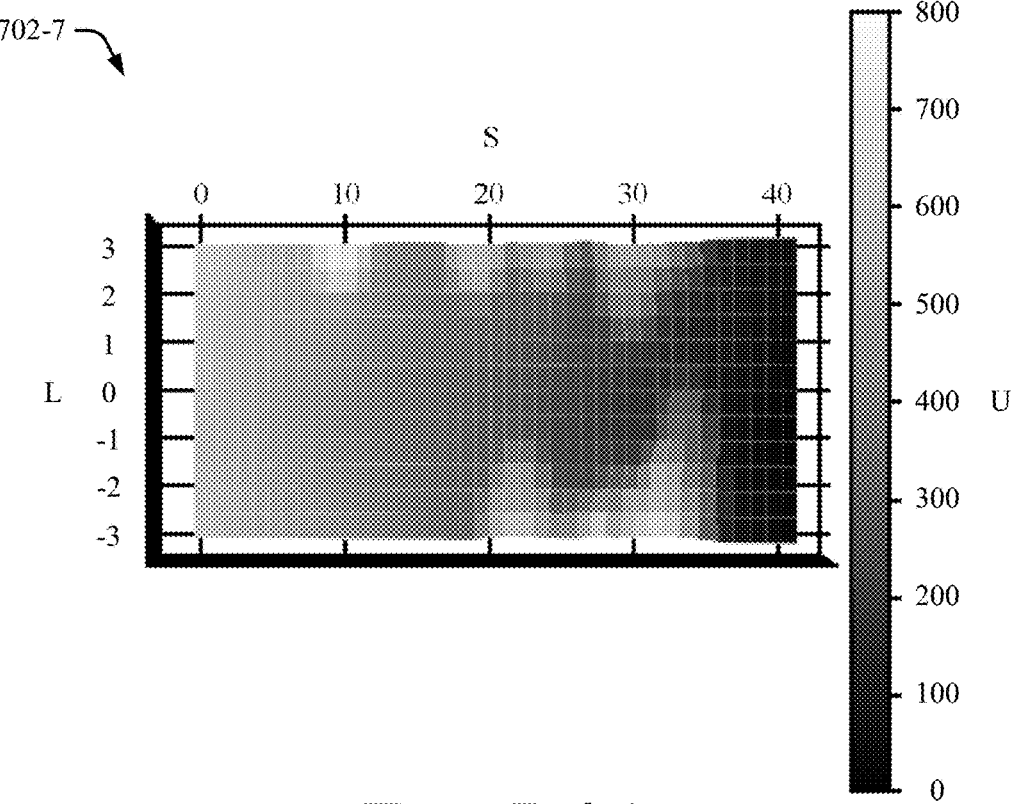
*FIG. 7-14*

800

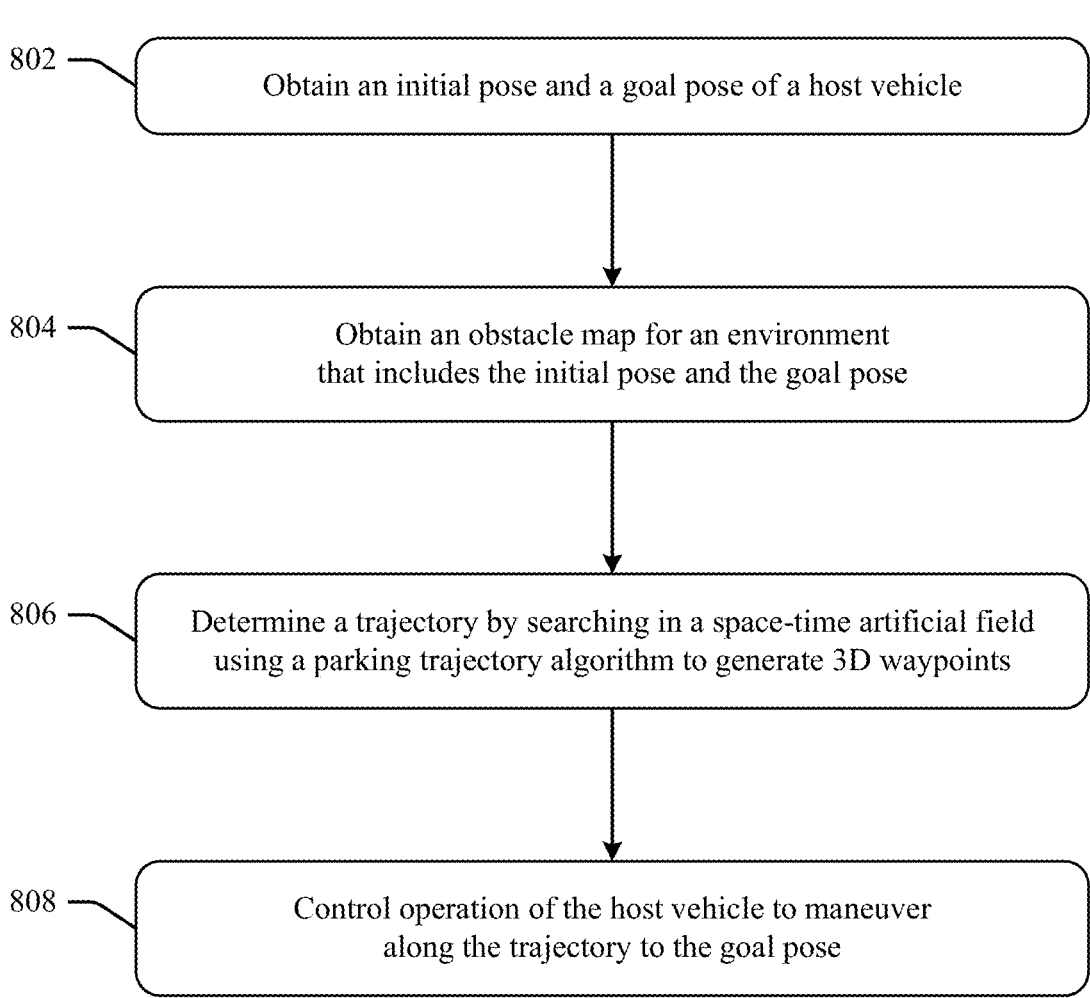

802 — Obtain an initial pose and a goal pose of a host vehicle

804 — Obtain an obstacle map for an environment
that includes the initial pose and the goal pose 806 — Determine a trajectory by searching in a space-time artificial field
using a parking trajectory algorithm to generate 3D waypoints 808 — Control operation of the host vehicle to maneuver
along the trajectory to the goal pose

*FIG. 8*

TRAJECTORY PLANNING IN A THREE-DIMENSIONAL SEARCH SPACE WITH A SPACE-TIME ARTIFICIAL POTENTIAL FIELD

BACKGROUND

Some vehicles provide autonomous or automated parking to assist drivers. Motion planning (e.g., a driving path to navigate a parking environment to park in a particular space or to respond to a summons request), however, is generally computationally expensive due to the large search space and complex environment (e.g., a combination of moving and stationary objects). For example, motion planning may involve the iterative use of both a path planner and a speed planner to provide a collision-free trajectory in a complex parking environment with decision-making (e.g., yield, bias, overtaking) to handle static and dynamic objects. As a result, the computational time to perform motion planning in many parking environments may be too long and insufficiently optimized for practical implementations.

SUMMARY

This document describes techniques and systems for trajectory planning in a three-dimensional (3D) search space with a space-time artificial potential field. An example system includes a processor that obtains an initial pose (e.g., a source node), a goal pose (e.g., a goal node), and an obstacle map for a parking environment or similar roadway. The processor may also obtain a reference path. The processor then uses a parking trajectory algorithm and the obstacle map (and reference map, if available) to determine a trajectory by searching in a space-time artificial potential field. The trajectory includes a series of 3D waypoints to navigate from the initial pose toward the goal pose. Each waypoint includes two-dimensional (2D) positional information or coordinates and time information or coordinates. The processor controls the operation of the host vehicle to maneuver along the trajectory to the goal pose using an assisted-driving or autonomous-driving system. In this way, the example system performs the trajectory search in the 3D search space with the space-time artificial potential field rather than iterating between two 2D search planes (e.g., a positional 2D plane and a time-distance plane). This allows motion planning for autonomous parking operations, especially in parking environments that include static and dynamic objects, to determine an optimal trajectory in a single iteration or a small number of iterations.

This document also describes methods performed by the above-summarized system and other configurations set forth herein and computer-executable instructions and means for performing these methods.

This Summary introduces simplified concepts related to trajectory planning in a 3D search space with a space-time artificial potential field in the Detailed Description and Drawings. This Summary is not intended to identify essential features of the claimed subject matter, nor is it intended to determine the scope of the claimed subject matter.

BRIEF DESCRIPTION OF THE DRAWINGS

The details of one or more aspects of techniques and systems for trajectory planning in a 3D search space with a space-time artificial potential field are described in this document with reference to the following figures. The same numbers are often used throughout the drawings to reference similar features and components:

FIGS. 5-1 through 5-4 illustrate an example 3D search space for trajectory planning;

FIGS. 6-1 through 6-4 illustrate example space-time artificial potential fields for trajectory planning;

FIGS. 7-1 through 7-14 illustrate an example trajectory of a vehicle with a parking system using a parking trajectory algorithm in a 3D search space with a space-time artificial potential field; and FIG. 8 illustrates an example method of a parking system to perform trajectory planning in a 3D search space with a space-time artificial potential field.

DETAILED DESCRIPTION

Overview

Figure 1:
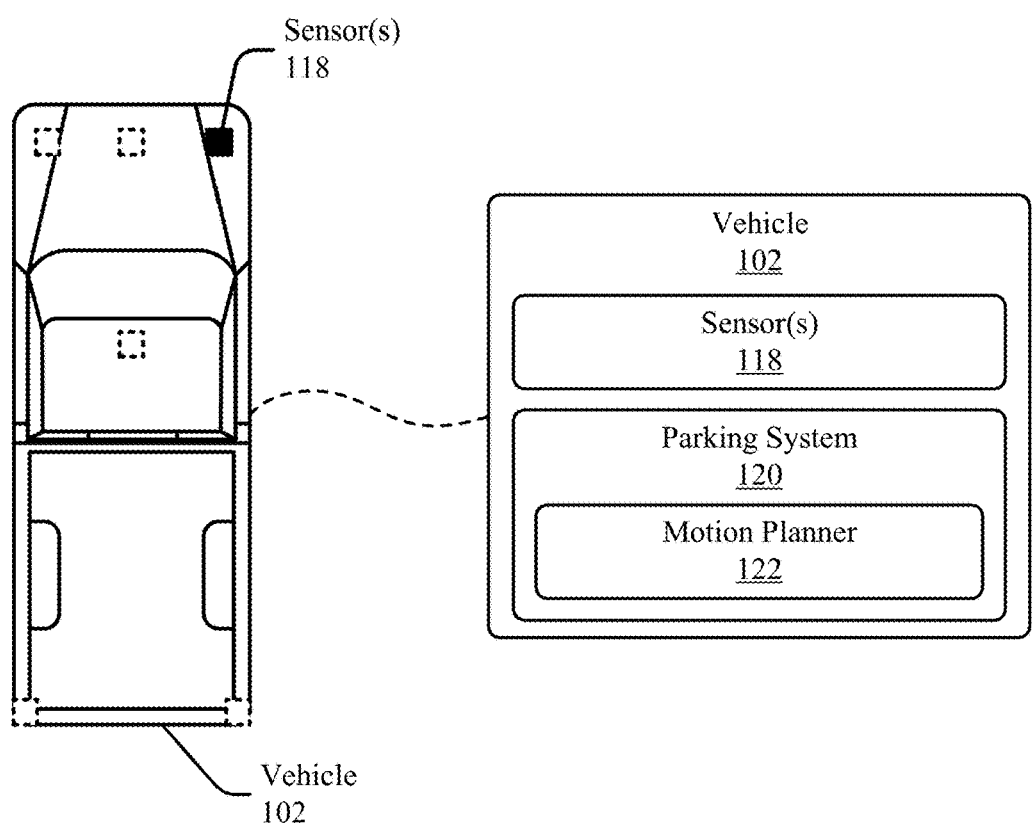
FIG. 1 illustrates an example environment in which a parking system performs trajectory planning in a 3D search space with a space-time artificial potential field in accordance with the techniques of this disclosure.
Figure 1:
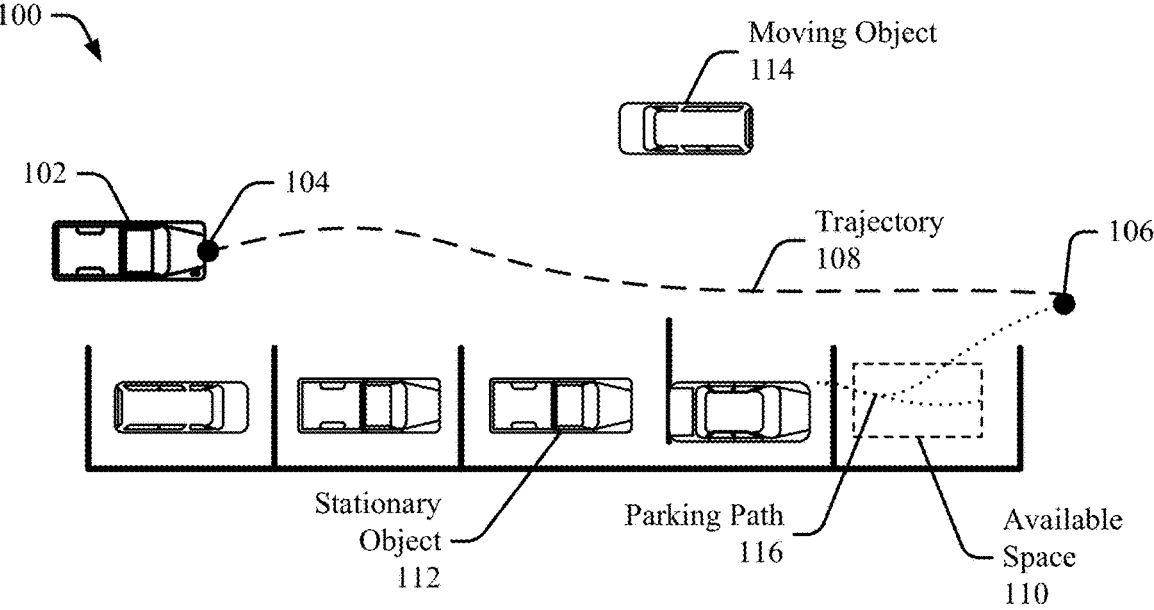

Some vehicles provide autonomous or automated parking and summoning functionality. Many autonomous or automated parking systems use parking path algorithms to generate a parking path (or summons path) and speed profile to navigate the host vehicle to a selected parking space (or respond to a summons request). Motion planning for autonomous parking and summoning, however, is a complex task due to the relatively large search space around the selected parking space, non-holonomic constraints on vehicle motion (e.g., vehicles cannot directly move sideways, but must move forwards or backward to effect a sideways movement), and avoidance of nearby obstacles (e.g., parked vehicles, moving vehicles, pedestrians, and other objects).

Some parking systems use an iterative combination of a path planner and a speed planner to generate a parking trajectory. In the path planner and at each search, these parking systems may predict an object's position and perform biasing (e.g., provide distance offsets) against it to generate a 2D path. A speed profile is then generated by the speed planner based on cost functions associated with avoiding nearby objects and reaching the desired destination (e.g., a parking spot). Because the host vehicle's speed profile may be changed by the speed planner based on a new or updated 2D path, the predicted object's position may also change, and the motion planner must determine another speed profile. The influence and impact of the path planner and the speed planner on each other in such parking systems results in an iterative path-speed algorithm. These parking systems may eventually reach a convergence of the 2D path and the speed profile after a relatively large number of iterations.

In contrast, this document describes techniques and systems for trajectory planning in a single 3D search space with a space-time artificial potential field without the need to iterate between a path planner and a speed planner. For example, a parking system obtains an initial pose (e.g., a source node), a goal pose (e.g., a goal node), and an obstacle map for the parking environment. The parking system may also receive a reference path for the trajectory. The parking system uses a parking trajectory algorithm, the obstacle map, and the reference path (if provided) to determine a trajectory by searching in a space-time artificial potential field. The trajectory includes a series of 3D waypoints, including 2D positional coordinates and time coordinates, to navigate the host vehicle from the initial pose toward the goal pose. The host vehicle is then controlled to maneuver along the trajectory toward the goal pose. In this way, the described techniques and systems perform the trajectory search in the entire 3D search space rather than iterating between two 2D search planes (e.g., a positional 2D plane and a time-distance plane). This allows motion planning for autonomous parking, especially in parking environments that include static and dynamic objects, to determine an optimal trajectory in a single iteration or a relatively small number of iterations.

This is just one example of the described techniques and systems for trajectory planning in a 3D search space with a space-time artificial potential field. This document describes other examples and implementations.

Operating Environment

FIG. 1 illustrates an example environment 100 in which a parking system 120 of a vehicle 102 (e.g., a host vehicle, an ego vehicle) performs trajectory planning in a 3D search space with a space-time artificial potential field in accordance with the techniques of this disclosure. In the depicted environment 100, the vehicle 102 is in a parking lot or other environment with multiple parking spaces. In other implementations, the environment 100 may be a roadway with parking spaces off to the side of the roadway. The parking spaces are illustrated in FIG. 1 as parallel to the travel path of the vehicle 102. The parking spaces may also be at an angle or perpendicular to the travel path of the vehicle 102. The environment 100 includes stationary objects 112 (e.g., other vehicles parked in some of the parking spaces, pillars, curbs, and barriers) and moving objects 114 (e.g., pedestrians and other vehicles navigating the environment 100). Environment 100 may also include an available space 110 that is unoccupied.

Although illustrated as a passenger truck, the vehicle 102 can represent other types of motorized vehicles (e.g., a car, an automobile, a motorcycle, a bus, a tractor, a semi-trailer truck), watercraft (e.g., a boat), or aircraft (e.g., an airplane). The vehicle 102 includes one or more sensors 118 and the parking system 120. In the depicted environment 100, the sensors 118 are mounted to, or integrated within, front, central, and rear portions of the vehicle 102. As described in greater detail below, the sensors 118 may include camera systems, radar systems, lidar systems, ultrasonic systems, and positioning systems. The sensors 118 can provide sensor data regarding the stationary objects 112 and moving objects 114 to the parking system 120 (e.g., as an obstacle map).

In addition, the parking system 120 or another component of the vehicle 102 can use the sensors 118 to obtain an initial pose 104 and/or a goal pose 106 of the vehicle 102 (e.g., to park in the available space 110). The sensors 118 can also be used to generate an obstacle map for the environment 100 that includes the stationary objects 112 and moving objects 114.

In the depicted implementation, the sensors 118 are mounted on the front of the vehicle 102 and may provide sensor data for building the obstacle map. The sensors 118 can detect nearby objects or parking-space characteristics from any exterior surface of the vehicle 102. For example, vehicle manufacturers can integrate a radar system, a lidar system, a camera, or an ultrasonic sensor into a bumper, side mirror, headlights, or any other interior or exterior location where objects (e.g., stationary objects 112, moving objects 114) require detection. In some cases, vehicle 102 includes multiple sensors and/or sensor types, such as a radar system and a camera, that provide a larger instrument field of view or improved detection of nearby objects. In general, vehicle manufacturers can design the locations of the sensors 118 to provide a particular field of view that encompasses a region of interest. Example fields of view include a 180-degree field of view, one or more 90-degree fields of view, and so forth, which can overlap or be combined into a field of view of a particular size.

The parking system 120 may provide assisted or autonomous driving to a driver of the vehicle 102. For example, the parking system 120 can identify a selected parking space (e.g., the available space 110) and generate a trajectory 108 to navigate from the initial pose 104 to the goal pose 106, which is near the selected parking space. In some implementations, the parking system 120 can then provide a parking path 116 to an assisted-driving or autonomous-driving system to park the vehicle 102 in the available space 110.

The parking system 120 can include a motion planner 122. The parking system 120 and the motion planner 122 can be implemented using hardware, software, firmware, or a combination thereof. The parking system 120 may also include a parking space selector that can identify the available space 110 and select it or another parking space for the vehicle 102. In other implementations, the driver can provide input to the parking system 120 to select a desired parking space.

The motion planner 122 may determine the trajectory 108, which includes both a positional path plan and a speed plan, for navigating the vehicle 102 from the initial pose 104 to the goal pose 106 (e.g., a position near the available space 110) while avoiding collisions with stationary objects 112 and moving objects 114. The trajectory 108 may also include the path plan and speed plan for navigating the environment 100 to find the available space 110 or exit the environment 100. The trajectory 108 includes a series of 3D waypoints, with each waypoint indicating 2D positional information or coordinates and time information or coordinates, in between the initial pose 104 and the goal pose 106. The motion planner 122 uses a space-time artificial potential field to plan trajectories in a 3D search space without iterating between a path planner and a speed planner in different 2D planes. For example, the motion planner 122 may use a variant of the A star (A*) or hybrid A* algorithms to determine the trajectory 108. In other implementations, the motion planner 122 may use Dijkstra, Anytime A*, D*, D* Lite, or similar algorithms.

Vehicle Configuration

Figure 2:
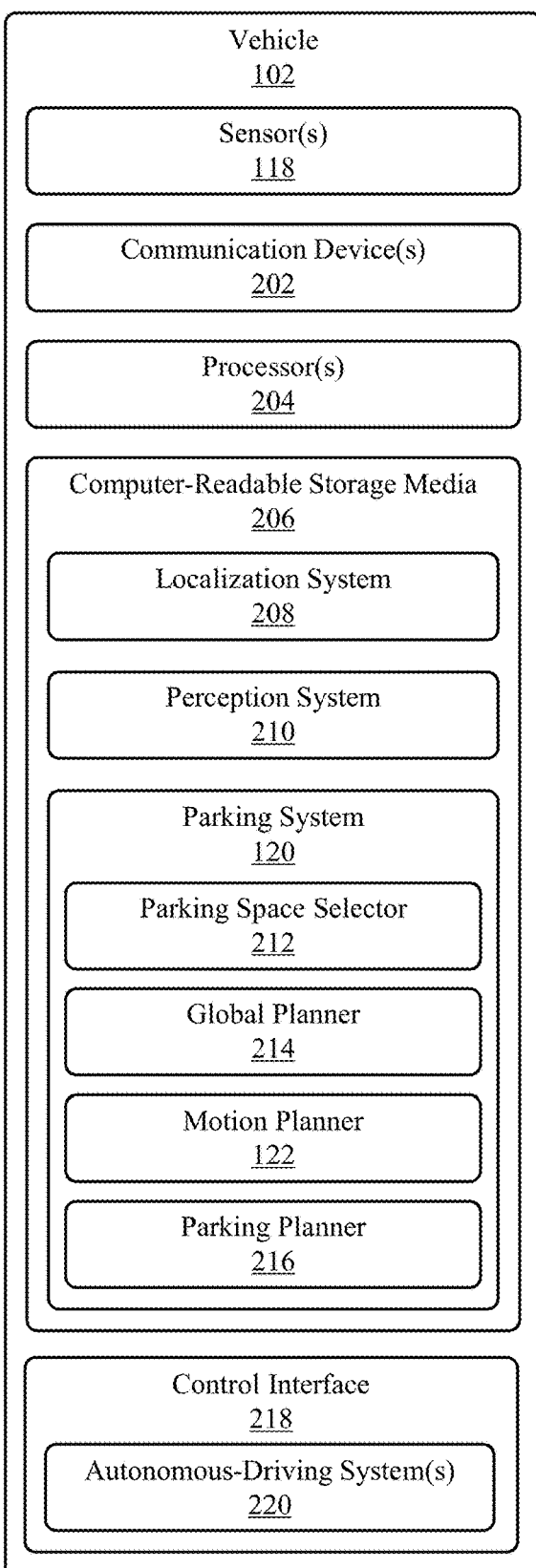
FIG. 2 illustrates an example configuration of a vehicle with a parking system that performs trajectory planning in a 3D search space with a space-time artificial potential field.

FIG. 2 illustrates an example configuration of the vehicle 102 with the parking system 120 that performs trajectory planning in a 3D search space with a space-time artificial potential field. As described in FIG. 1, the vehicle 102 includes the sensors 118 and the parking system 120, which may include a parking space selector 212, a global planner 214, the motion planner 122, and a parking planner 216. In addition, the vehicle 102 may include one or more communication devices 202, one or more processors 204, computer-readable storage media (CRM) 206, and a control interface 218 to one or more vehicle-based systems, including one or more autonomous-driving systems 220.

The communication devices 202 can include a sensor interface and a vehicle-based system interface. The sensor interface and the vehicle-based system interface can transmit data (e.g., radar data, range computations) over a communication bus of the vehicle 102, for example, when the individual components of the sensors 118 and/or the parking system 120 are integrated within the vehicle 102.

The processors 204 (e.g., an energy processing unit or electronic control unit) may be a microprocessor or a system-on-chip. The processors 204 execute instructions stored in the CRM 206, on one or more disks, memories, or other non-transitory computer-readable storage media. For example, the processors 204 may process sensor data from the sensors 118 and execute instructions loaded from the CRM 206 to cause them to generate an obstacle map for the parking environment, determine the trajectory 108 (which may be referred to as a cruise trajectory) for driving toward a parking space or to fulfill a summons request, or navigate the parking environment. The instructions may cause the processor 204 to be configured to generate the trajectory 108, including a path plan and speed plan, for at least one automotive system. For example, the processors 204 execute the instructions on the CRM 206 to control, based on sensor data, the autonomous-driving system 216 to operate the vehicle 102 using the trajectory 108 to get near a selected parking space.

The parking system 120 can be stored in the CRM 206. As described above, the parking system 120 may include the parking space selector 212, the global planner 214, the motion planner 122, and the parking planner 216. The parking space selector 212 can identify available spaces or select a parking space (e.g., an optimal parking space) for the vehicle 102. The selected parking space may be presented to the driver of vehicle 102 on a display (e.g., an overlay on a photographic or video feed of the parking environment or a graphical representation of the parking environment). The parking space selector 212 may also determine nearby available spaces and present them on a video display to the driver of vehicle 102. The driver may then select the space into which the parking system 120 parks the vehicle 102.

The global planner 214 provides high-level motion planning for the parking system 120. For example, the global planner 214 may provide a reference path to the motion planner 122 (which may also be referred to as a local planner) for navigating close to a selected parking space, fulfilling a summons request, or exiting a parking environment. The reference path provides an ideal or suggested path plan from an initial pose 104 to a goal pose 106. The global planner 214 generally uses map data for the parking environment to generate the reference path. The map data may be stored locally in the vehicle 102 or be obtained from a remote computer system using communication devices. In other implementations, the reference path may be a stored path for a commonly-visited parking environment (e.g., a learned or trained trajectory for parking in a designated location at the driver's home or work).

The motion planner 122 determines the trajectory 108 for navigating the parking environment from the initial pose 104 to the goal pose 106. As described below, the motion planner 122 may determine a series of 3D waypoints to safely navigate the parking environment (e.g., avoiding a collision with stationary objects 112 and moving objects 114). The 3D waypoints include 2D positional coordinates and time coordinates. The vehicle's heading may be determined by taking the derivative of the 2D positions (e.g., dy/dx or dS/dL). Velocity components may be determined by taking the derivative along a positional axis as a function of time (e.g., dx/dt, dy/dt, dS/dt, dL/dt).

The parking planner 216 determines a parking path (e.g., the parking path 116 of FIG. 1) to navigate from the goal pose 106 into a selected parking space (e.g., the available space 110 of FIG. 1). The parking planner 216 may also determine a maneuver type (e.g., front-in parking, back-in parking, single-turn maneuver, two-turn maneuver) for parking in the selected parking space. For example, the parking planner 216 may determine, based on parking-space characteristics, that the vehicle 102 cannot perform a single-turn maneuver into the selected parking space because the entry turning radius is smaller than the minimum inner turning radius of vehicle 102. The parking planner 216 may also determine, based on driver preferences or input, to perform a single- or two-turn maneuver followed by a back-in movement to park in the selected parking space.

The vehicle 102 also includes the control interface 218 to one or more vehicle-based systems, which individually or in combination provide a way for receiving the trajectory 108 to control the vehicle 102. One example of vehicle-based systems to which the control interface 218 supplies parking information includes the autonomous-driving system 220, which may rely on information output from the parking system 120. For example, the autonomous-driving system 220 may rely on data, which is communicated via the communication devices 202 and obtained from the sensors 118, to operate the vehicle 102 in a crowded parking environment along the trajectory 108 toward the goal pose 106. For example, the autonomous-driving system 220 can use data provided by the parking system 120 and/or sensors 118 to control operations of the vehicle 102 to navigate close to a selected parking space (followed by using a parking path 116 to park in the selected parking space), fulfill a summons request, or navigate through a parking environment.

Example Trajectory Planning Flowchart

Figure 3:
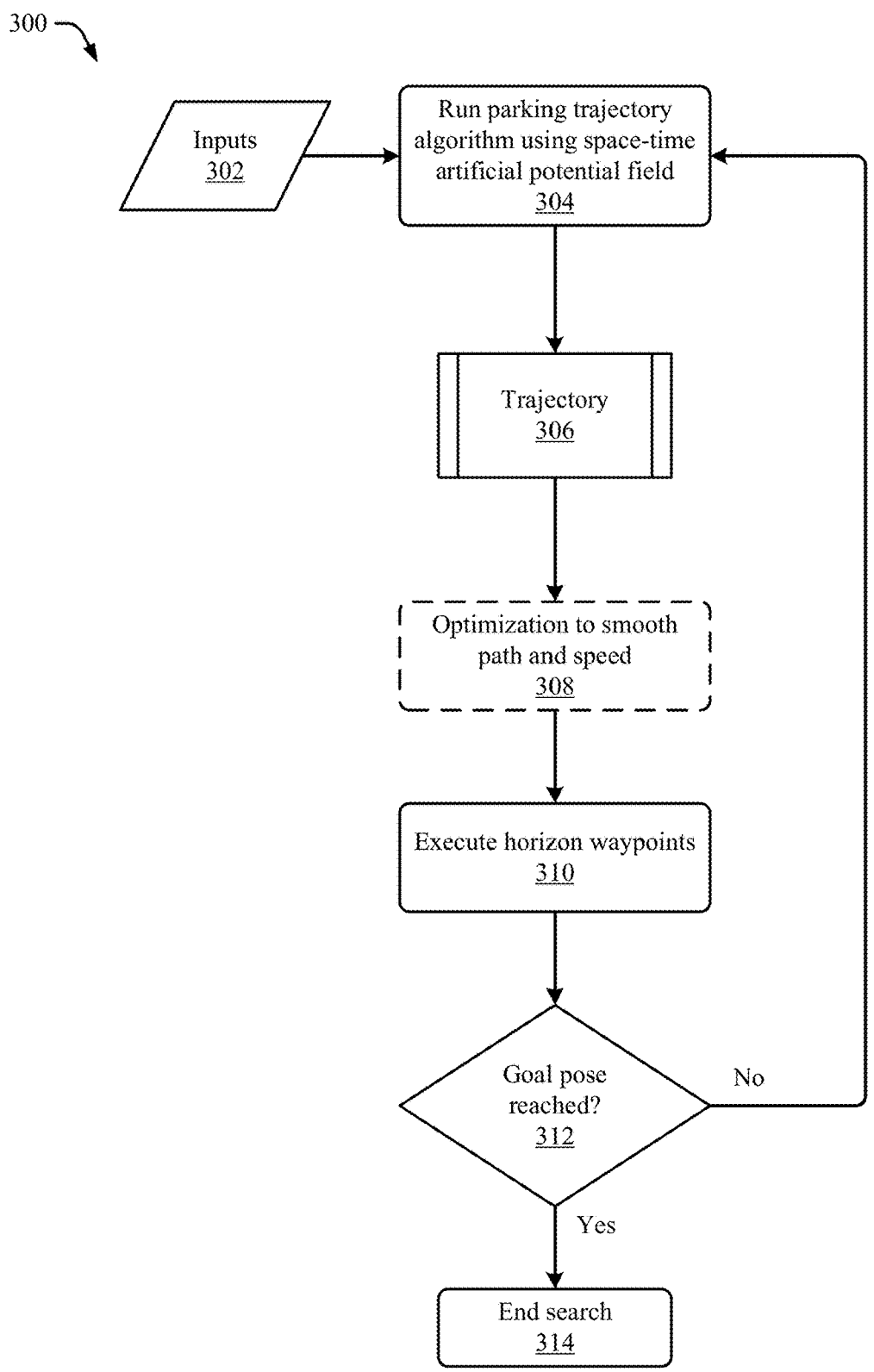
FIG. 3 illustrates an example flowchart of the described techniques and systems for trajectory planning in a 3D search space with a space-time artificial potential field.

FIG. 3 illustrates an example flowchart 300 of the described techniques and systems for trajectory planning in a 3D search space with a space-time artificial potential field. The parking system performing the techniques of FIG. 3 can, for example, be the parking system 120 and/or the motion planner 122 of FIGS. 1 and 2. The output of the flowchart 300 is a trajectory 306, which may be provided as input to the autonomous-driving system 220 to operate vehicle 102 along the trajectory 306 to navigate the parking environment (e.g., to get near an available parking space, to find an available space, or exit the parking lot).

At step 304, the parking system 120 or the motion planner 122 obtains inputs 302 and runs a parking trajectory algorithm in a 3D search space with a space-time artificial potential field. The 3D search space includes two positional dimensions and a time dimension. The inputs 302 include an initial or current pose of the vehicle 102, a goal pose near a selected parking space or destination within the parking environment, and an obstacle map. The initial pose may represent a source node for the parking trajectory algorithm and may be obtained from the localization system 208, which uses location data to determine the vehicle's location. The goal pose may represent a goal node for the parking trajectory algorithm and may be obtained from the parking space selector 212 or another system of the parking system 120. The parking system 120 may also obtain the obstacle map for the environment near, around, and including the initial pose and the goal pose. The obstacle map may be obtained from the perception system 210, which uses sensor data to generate and populate the obstacle map. In some implementations, the obstacle map can be a radar occupancy grid map generated from radar data or a similar type of occupancy grid map (e.g., an occupancy grid map that fuses data from multiple types of sensors).

The parking trajectory algorithm utilizes space-time artificial potential fields and a graph-search based algorithm to plan the trajectory 306 of the vehicle 102 in the parking environment. The parking trajectory algorithm first discretizes the 3D search space into an array of 3D nodes and assigns artificial potential field values or magnitudes to each node using potential field functions. The parking trajectory algorithm determines a trajectory that travels from the current position (e.g., the initial pose) to the goal position with the lowest cost or potential.

Two general kinds of artificial potential fields are generated within the parking trajectory algorithm: attractive potentials and repulsive potentials. In general, the goal pose and a reference path (if provided) exhibit an attractive potential, while obstacles (e.g., moving objects 114, stationary objects 112, and boundaries) produce repulsive potentials. The attractive or repulsive potentials are a function of the distance (e.g., an inverse, linear, quadratic, or exponential relationship) between the vehicle 102 and the potential source. As a result, the total potential, $U_{total}(s, l, t)$, at any point or node within the parking environment is determined from the sum of the attractive potentials, $U_{attractive}(s, l, t)$, and the repulsive potentials, $U_{repulsive}(s, l, t)$, as illustrated in Equation (1):

$$U_{total}(s, l, t) = U_{attractive}(s, l, t) + U_{repulsive}(s, l, t) \qquad (1)$$

Attractive potentials may be generated from reference lines, reference paths, goal lines, and goal nodes. Reference lines may represent a lateral center of a lane or implied lane for the vehicle 102 to travel within. Reference paths may represent an ideal path for the vehicle 102 to travel from the source node to the goal node or goal line following marked lanes in the parking environment, which assumes no obstacles are present. Goal lines may represent a lateral (or another direction) line to which the vehicle 102 is to travel to either exit the parking environment or navigate it in search of an available space 110. The attractive potentials from reference paths and goal poses are illustrated in Equations (2) and (3), respectively:

$$U_{ref\_path}(s, l, t) = w_{ref\_path} d_{path} \qquad (2)$$

$$U_{goal}(s, l, t) = w_{goal} d_{goal} \qquad (3)$$

where $w_{ref\_path}$ and $w_{goal}$ represent weights with the same or different constant values and $d_{path}$ and $d_{goal}$ represent the Euclidian distance from the current position of the vehicle 102 to the goal position or the smallest distance from the current position of the vehicle 102 to the reference path or goal line, respectively.

Figures 1, 2, 6:
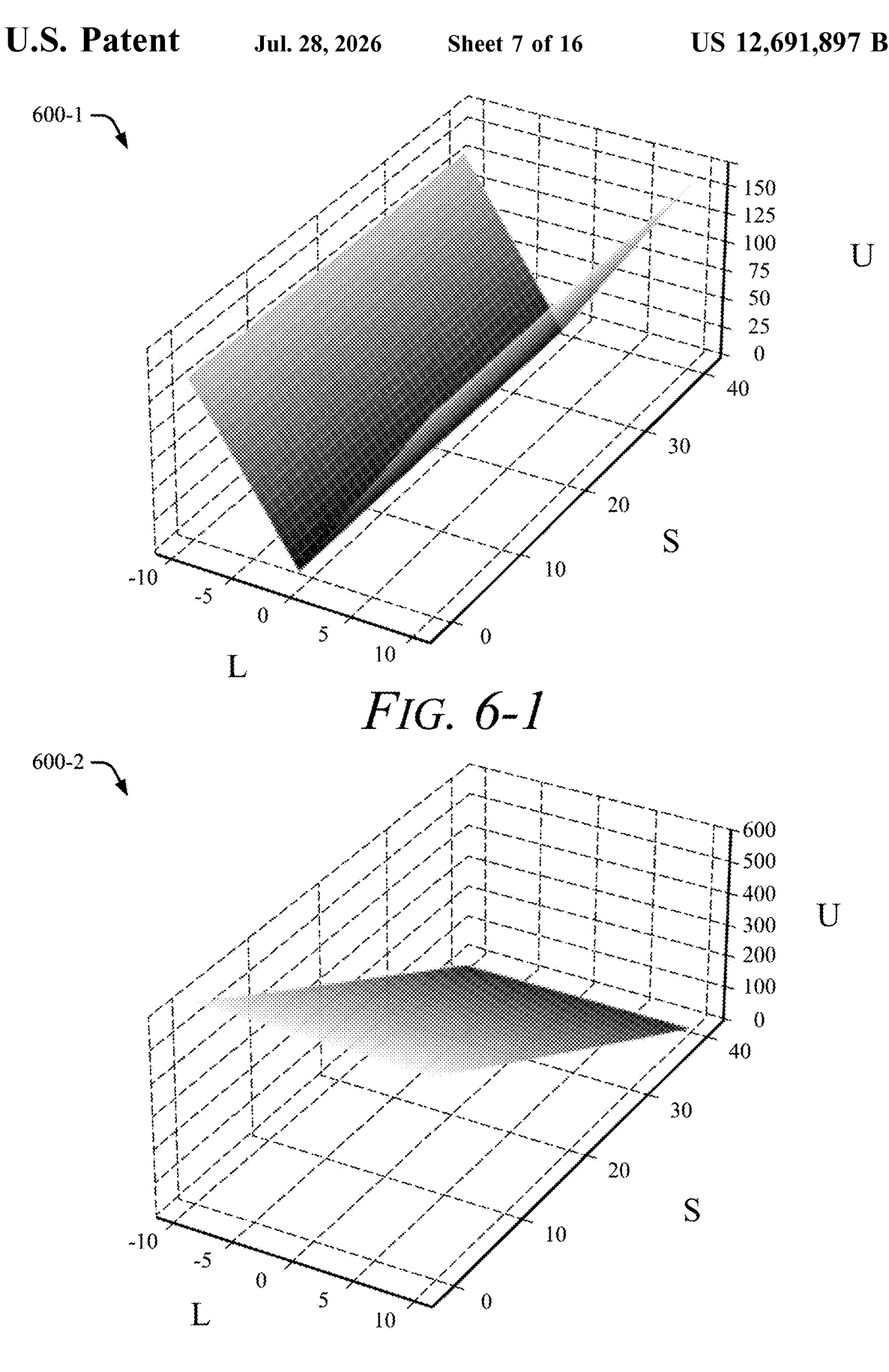
Figures 3, 4, 6:
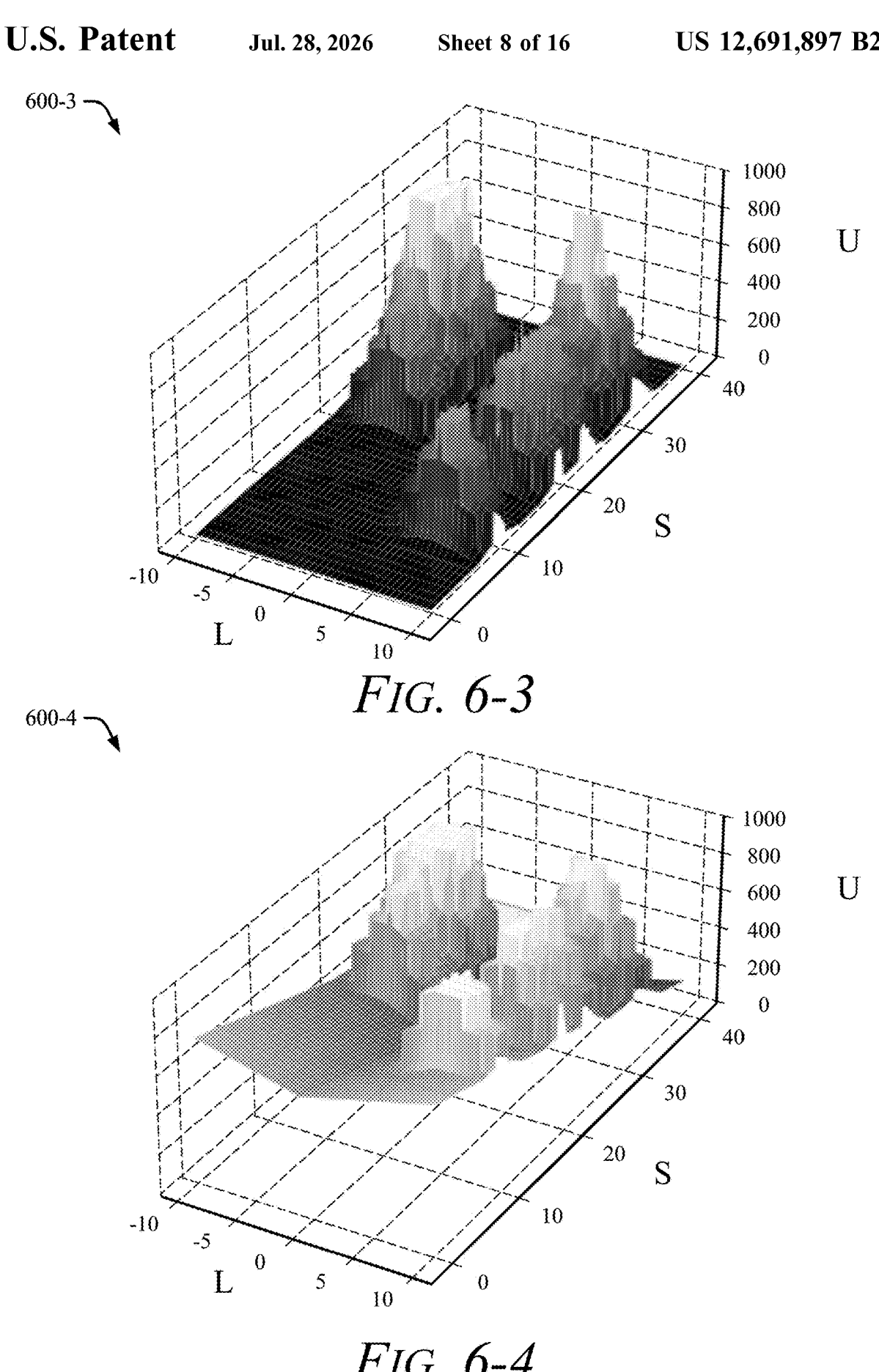

FIGS. 6-1 and 6-2 illustrate example attractive potential fields 600-1 and 600-2, respectively, used by the motion planner 122 to determine the trajectory 306. In FIG. 6-1, graph 600-1 illustrates the attractive potential field generated by a reference path. The reference path is offset from an S-axis. The magnitude of the attractive potential linearly increases based on the lateral (L) distance to the reference path or line.

In FIG. 6-2, graph 600-2 illustrates the attractive potential field generated by a goal line. The goal line is a line with an S value of 40. The magnitude of the attractive potential linearly increases based on the distance to the goal line along the S-axis.

Repulsive potentials can be generated from boundaries and obstacles. If used, repulsive potentials by boundaries are useful for keeping the vehicle 102 away from the boundaries of the parking environment. The repulsive potentials from obstacles are illustrated in Equation (4):

$$U_{obstacle}(s, l, t) = w_{obs} * \begin{cases} C_{collision}, & d \le d_c \\ C_{gradient}(d_g - d), & d_c < d \le d_g \\ 0, & d > d_g \end{cases} \qquad (4)$$

where $w_{obs}$ represents a weight with a constant value, d represents the distance between the vehicle 102 and the obstacle, $d_c$ represents a collision distance offset a small distance around the obstacle, $d_g$ represents a gradient distance offset around the obstacle, and $C_{collision}$ and $C_{gradient}$ represent a cost associated with being within a respective distance from the obstacle.

Figure 4:
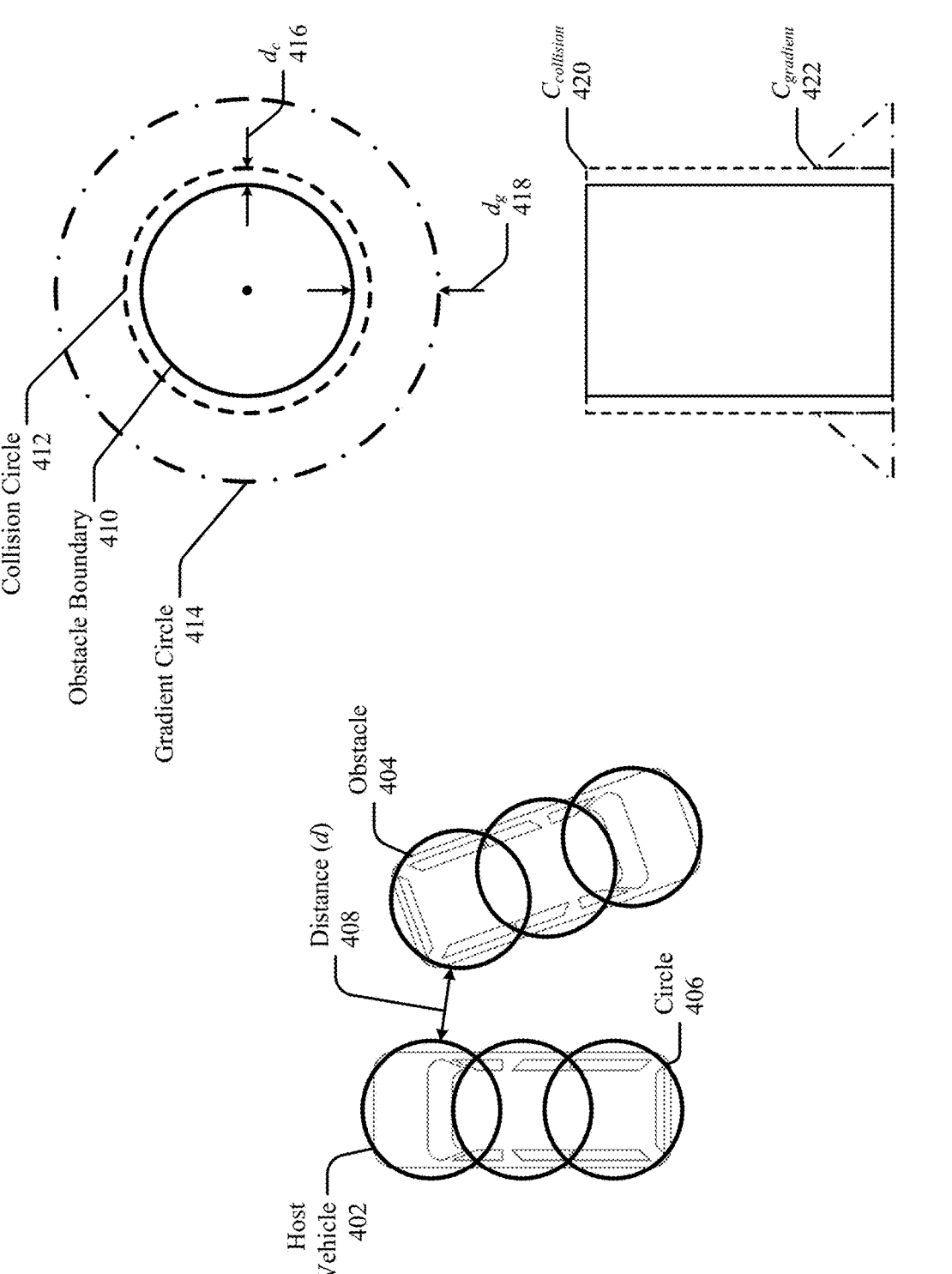
FIG. 4 illustrates example techniques for determining repulsive potentials for trajectory planning in a 3D search space with a space-time artificial potential field.

FIG. 4 illustrates example techniques for determining repulsive potentials in trajectory planning in a space-time field. In particular, FIG. 4 illustrates a host vehicle 402 (e.g., vehicle 102 of FIGS. 1 through 3) and a nearby obstacle 404 (e.g., another vehicle). In the parking trajectory algorithm, representation of the host vehicle 402 and obstacle 404 is simplified by using one or more circles. In the illustrated example, both the host vehicle 402 and the obstacle 404 are represented by three circles 406.

The distance, d, 408 from Equation (4) can be determined using Equation (5):

$$d = \sqrt{(s_{host} - s_{obs})^2 + (l_{host} - l_{obs})^2} - r_{host} - r_{obs} \qquad (5)$$

where $s_{host}$ and $s_{obs}$ represent the s-coordinates of the circle centers of the host vehicle 402 and the obstacle 404, respectively; $l_{host}$ and $l_{obs}$ represent the l-coordinates of the circle centers of the host vehicle 402 and the obstacle 404, respectively; and $r_{host}$ and $r_{obs}$ represent the radius of the circles 406 representing the host vehicle 402 and the obstacle 404, respectively.

In Equations (1) through (5), the positional coordinates are provided in station (S or s) and lateral (L or l) dimensions. The S dimension indicates a distance along a path and the L dimension indicates a perpendicular offset from the path. Cartesian coordinates may also be used to represent the 2D search space with an x-axis and y-axis normal to each other in either a global coordinate system or a vehicle coordinate system. Similarly, polar coordinates or another positional coordinate system may be used for the 2D positional search space in the space-time field.

The collision distance offset, $d_c$, 416 represents the distance between an obstacle boundary 410 and a collision circle 412 of the obstacle 404. The obstacle boundary 410 represents the approximate boundary of the obstacle 404 as represented by the circle 406. The collision circle 412 represents an area within which a collision with the obstacle 404 occurs or is likely to occur. The gradient distance offset, $d_g$, 418 represents the distance between a gradient circle 414 and the obstacle boundary 410. The gradient circle 414 represents an area within which the repulsive potential from the obstacle 404 linearly decreases. In other implementations, the repulsive potential can decrease at a quadratic, exponential, or some other value within the gradient circle 414. The collision cost, $C_{collision}$, 420 and the gradient cost, $C_{gradient}$, 422 represent the cost for the host vehicle 402 being within the collision circle 412 or the gradient circle 414, respectively, of the obstacle 404. For example, the collision cost, $C_{collision}$, 420 and the gradient cost, $C_{gradient}$, 422 may have values of 100 and 25, respectively. In other implementations, different values can be used for both the collision cost, $C_{collision}$, 420 and the gradient cost, $C_{gradient}$, 422.

FIG. 6-3 illustrates example repulsive potential fields 600-3 used by the motion planner 122 to determine the trajectory 306. Graph 600-3 illustrates the repulsive potential fields generated by nine parked vehicles in the parking environment. The magnitude of the repulsive potential fields increases as the vehicle 102 nears the respective object(s).

FIG. 6-4 illustrates example space-time artificial potential fields 600-4 used by the motion planner 122 to determine the trajectory 306 for a single point in time. In particular, graph 600-4 illustrates the combination of the attractive and repulsive potentials or potential fields from graphs 600-1, 600-2, and 600-3.

The result of the parking trajectory algorithm is the trajectory 306. The trajectory 306 includes a series of 3D waypoints with 2D positional coordinates and time coordinates for the vehicle 102 to navigate from the initial pose toward the goal pose. The 2D positional coordinates are expressed in terms of the two positional dimensions (e.g., within an SL plane). The slope of the positional coordinates (e.g., dS/dL) indicate a heading of the vehicle 102. The location provided by the positional coordinates may be expressed in a vehicle coordinate system or a global coordinate system. The time coordinates may be used to determine velocity components of the trajectory 306. In particular, the longitudinal velocity component is indicated by the slope in the ST plane (e.g., dS/dT) and the lateral velocity component is indicated by the slope in the LT plane (e.g., dL/dT).

At optional step 308, the motion planner 122 optimizes the trajectory 306 to smooth the path and speed of the vehicle 102 together. For example, the motion planner 122 can optimize the trajectory 306 to reduce curvature, acceleration, or any jerkiness using inequality constraints.

As another example, the motion planner 122 can introduce a speed penalty to minimize occurrences of the vehicle 102 traveling faster or slower than a reference speed. The speed penalty may also include a maximum speed or minimum speed that may not be exceeded. Similarly, the motion planner 122 may also consider kinematic constraints (e.g., steering limits) and dynamic constraints (e.g., changes in elevation of the roadway that may, for example, occur on a ramp) to introduce other penalties to influence or optimize the trajectory 306. In other implementations, these penalties and constraints may be integrated as part of the parking trajectory algorithm in step 304.

At step 310, the parking system 120 or the autonomous-driving system 220 executes horizon waypoints from the trajectory 306. The horizon waypoints represent a subset of the trajectory 306. For example, the horizon waypoints may represent the trajectory 306 for a two-second cycle or execution time. As a result, the motion planner 122 provides the 3D waypoints required to execute two seconds of the trajectory 306 and then replans the remainder of the trajectory 306 to account for updated information (e.g., changes to the track of a moving object 114 or perception of a new object). The horizon waypoints may represent a different execution time (e.g., one second) or a distance threshold (e.g., ten meters or ten percent of the total path). In this way, the parking system 120 performs a receding horizon scheme by searching for a longer trajectory but only executing a small part of it and then replanning.

At step 312, the parking system 120 determines whether the goal pose was reached. If not, then the parking system 120 returns to step 304 and the motion planner 122 runs the parking trajectory algorithm in the 3D search space with a space-time artificial potential field to replan the rest of the trajectory 306. If the goal pose has been reached, then the motion planning is ended.

Figures 1, 5:
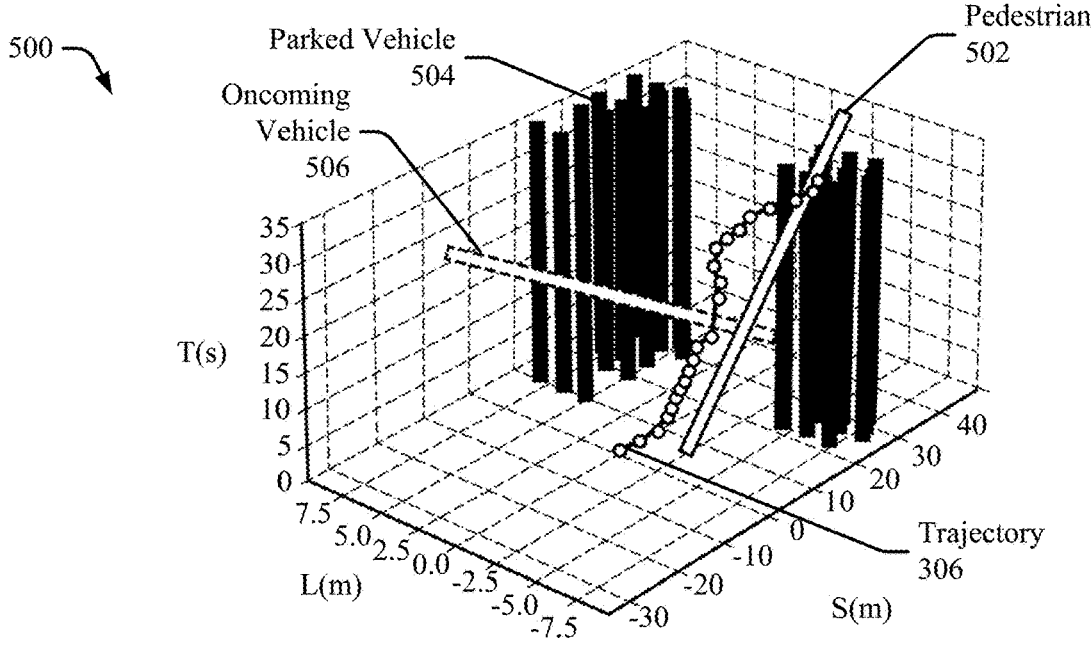
Figures 2, 5:
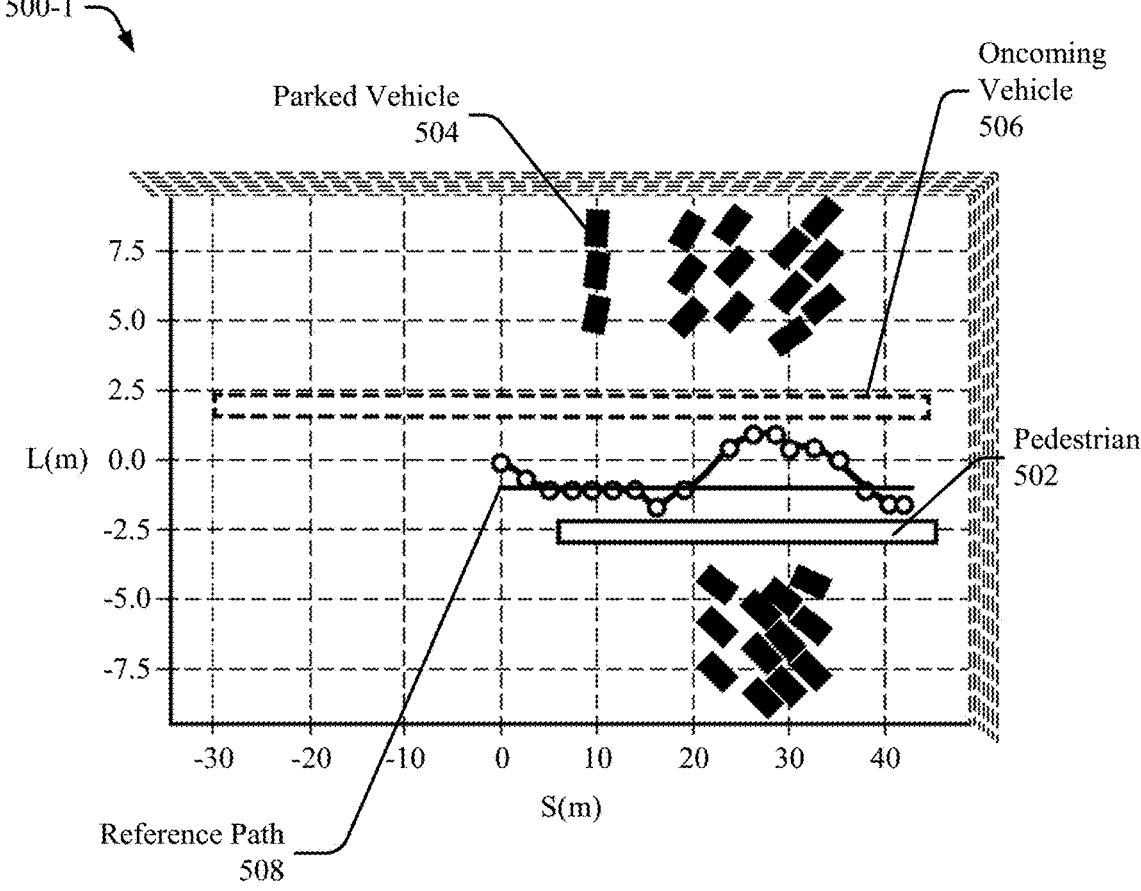
Figures 3, 5:
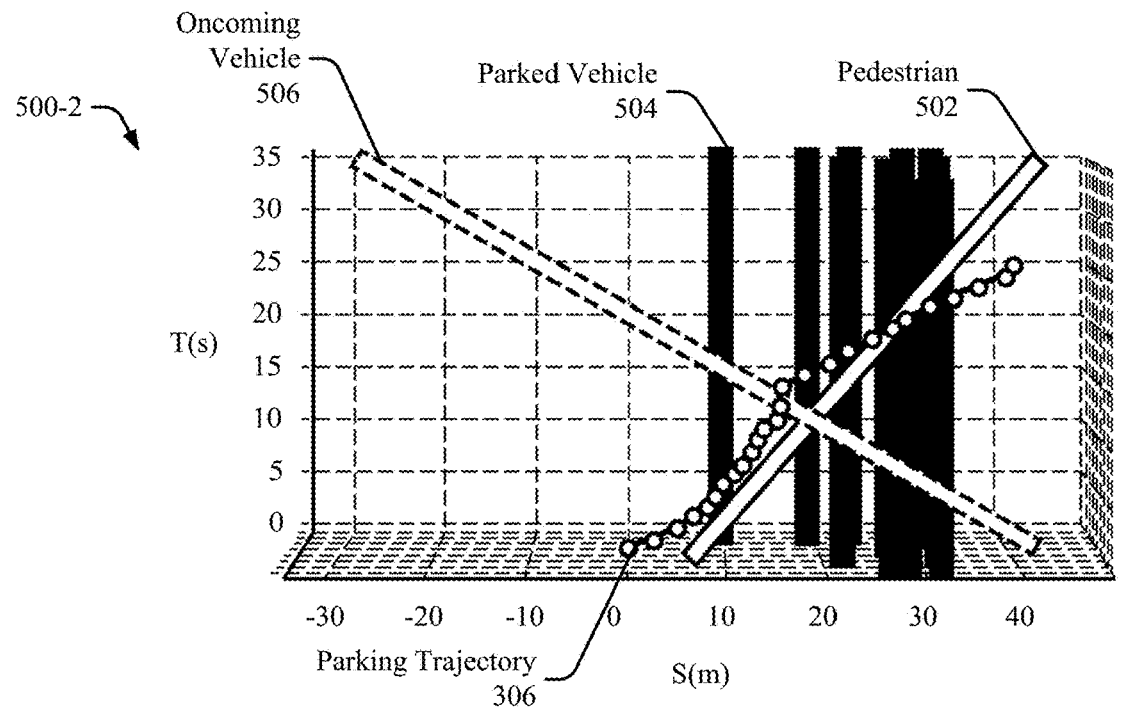
Figures 4, 5:
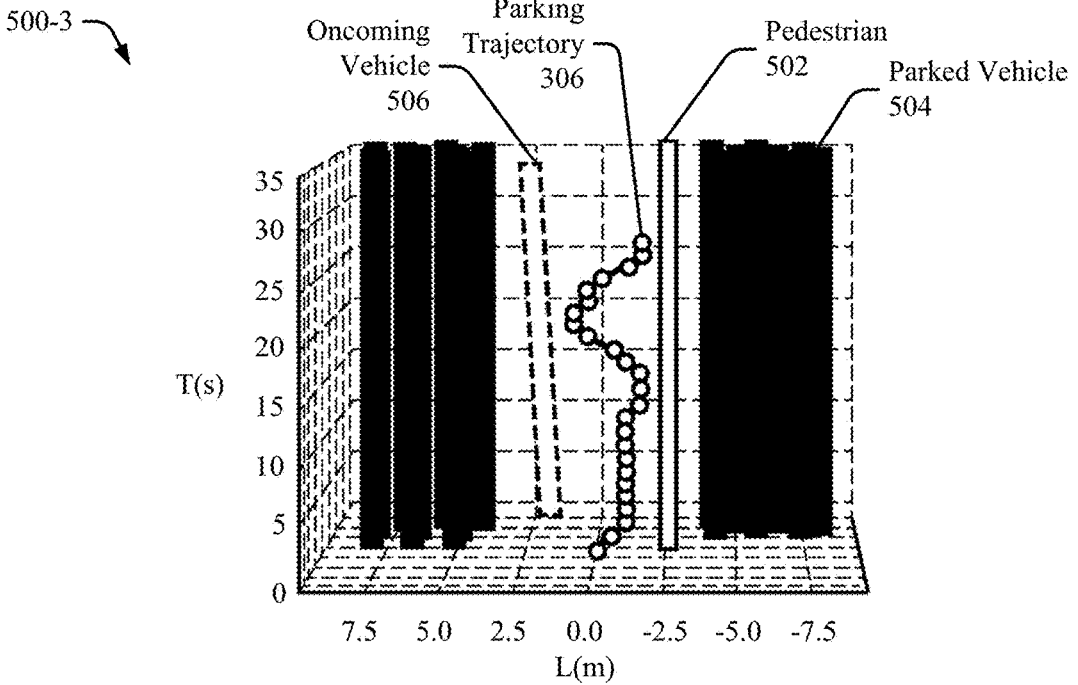

FIGS. 5-1 through 5-4 illustrate an example 3D search space 500 for trajectory planning. In particular, FIG. 5-1 illustrates the 3D search space 500 of the environment and trajectory planning from FIG. 3 as an example three-dimensional (3D) search space occupied by obstacles and the trajectory 306.

The 3D search space 500 adds a time (T) dimension to a traditional two-dimensional (2D) search space for trajectory planning. As illustrated in FIGS. 5-1 through 5-4, the 2D positional search space may be represented by a station(S) dimension that indicates a distance along a path and a lateral (L) dimension that indicates a perpendicular offset from the path. Cartesian coordinates may also represent the 2D positional search space with an x-axis and y-axis normal to each other in either a global coordinate system or a vehicle coordinate system. Similarly, polar coordinates may be used for the 2D positional search space.

In FIG. 5-1, the 3D search space 500 includes a longitudinal S-axis, a lateral L-axis, and a vertical T-axis. Stationary objects (e.g., parked vehicles 504) appear as vertical lines relative to the S-L plane because their position is independent of time. Moving objects (e.g., an oncoming vehicle 506 and a pedestrian 502) may appear as straight lines in the space-time field 500 if they are predicted to have a uniform velocity. The slope of the line for a moving object represents its predicted velocity. The trajectory 306 is illustrated as a B-spline curve with its 3D waypoints illustrated as circles.

In FIG. 5-2, a 2D SL search space 500-1 is illustrated. The 2D SL search space 500-1 is a projection of the 3D search space 500 onto the S-L plane. The position of parked vehicles 504 remains as a dot, which looks like a rectangle due to the perspective view. In contrast, the position of the pedestrian 502 and the oncoming vehicle 506 appear as a line because of their predicted movement over time. The trajectory 306 indicates how the vehicle 102 deviated from the reference path 508 as it swerved to provide a greater offset between it and the oncoming vehicle 506 and the pedestrian 502.

In FIG. 5-3, a 2D ST search space 500-2 is illustrated. The 2D ST search space 500-2 is a projection of the 3D search space 500 onto the S-T plane. The position of the parked vehicles 504 is represented as a vertical line because their positions do not change over time. In contrast, the position of the pedestrian 502 appears as a straight line with a positive slope as the pedestrian 502 is predicted to travel at a uniform speed in the same direction as the vehicle 102. The position of the oncoming vehicle 506 appears as a straight line with a negative slope as it is predicted to travel at a uniform speed toward and beyond the vehicle 102. The trajectory 306 indicates the S position of the vehicle 102 over time. The vehicle 102 briefly stops to allow the oncoming vehicle 506 to pass before passing the pedestrian 502, resulting in the slope of the trajectory 306 being vertical. The instantaneous longitudinal velocity of the vehicle 102 can be determined as the inverse of the instant slope at any point along the trajectory 306.

In FIG. 5-4, a 2D LT search space 500-3 is illustrated. The 2D LT search space 500-3 is a projection of the 3D search space 500 onto the L-T plane. The position of the parked vehicles 504 is represented as a vertical line because their positions do not change over time. Similarly, the position of the pedestrian 502 appears as a vertical line because the lateral position of the pedestrian is predicted to not change over time (e.g., the pedestrian walks in a straight line with a uniform offset from the reference path 508). Similarly, the position of the oncoming vehicle 506 appears as a vertical line (which looks like a straight line with a small negative slope due to the perspective view) because the lateral position of the vehicle is predicted to not change. The trajectory 306 indicates the L position of the vehicle 102 over time as it swerved to make room for the oncoming vehicle 506 and then swerved in the opposite lateral direction to pass the pedestrian 502. The instantaneous lateral velocity of the vehicle 102 can be determined as the inverse of the instant slope at any point along the trajectory 306.

FIGS. 7-1 through 7-14 illustrate the example trajectory 306 of the vehicle 102 with the parking system 120 using a parking trajectory algorithm in the 3D search space 500 with space-time artificial potential fields. The trajectory 306 is illustrated using graphs 700 which illustrate snapshots of the travel of vehicle 102 in a parking environment. Graphs 700 provide different snapshots of the 2D SL search space 500-1 over time as the vehicle 102 travels toward a goal pose. The position of the vehicle 102 is represented using the S-axis (e.g., longitudinally ahead of the vehicle) and a lateral (L) axis perpendicular to the S-axis. As illustrated in FIGS. 5-1 through 5-4, the environment includes multiple stationary objects, specifically nine parked vehicles 504. The parked vehicles 504 define a drivable aisle in which the vehicle 102 may navigate objects and travel. The environment also includes several moving objects, specifically the pedestrian 502 and the oncoming vehicle 506. The pedestrian 502 is slowing moving in the same direction as the vehicle 102, while the oncoming vehicle 506 is traveling toward the vehicle 102. The reference path 508 is provided to the motion planner 122 to provide an additional attractive potential.

Figures 1, 2, 7:
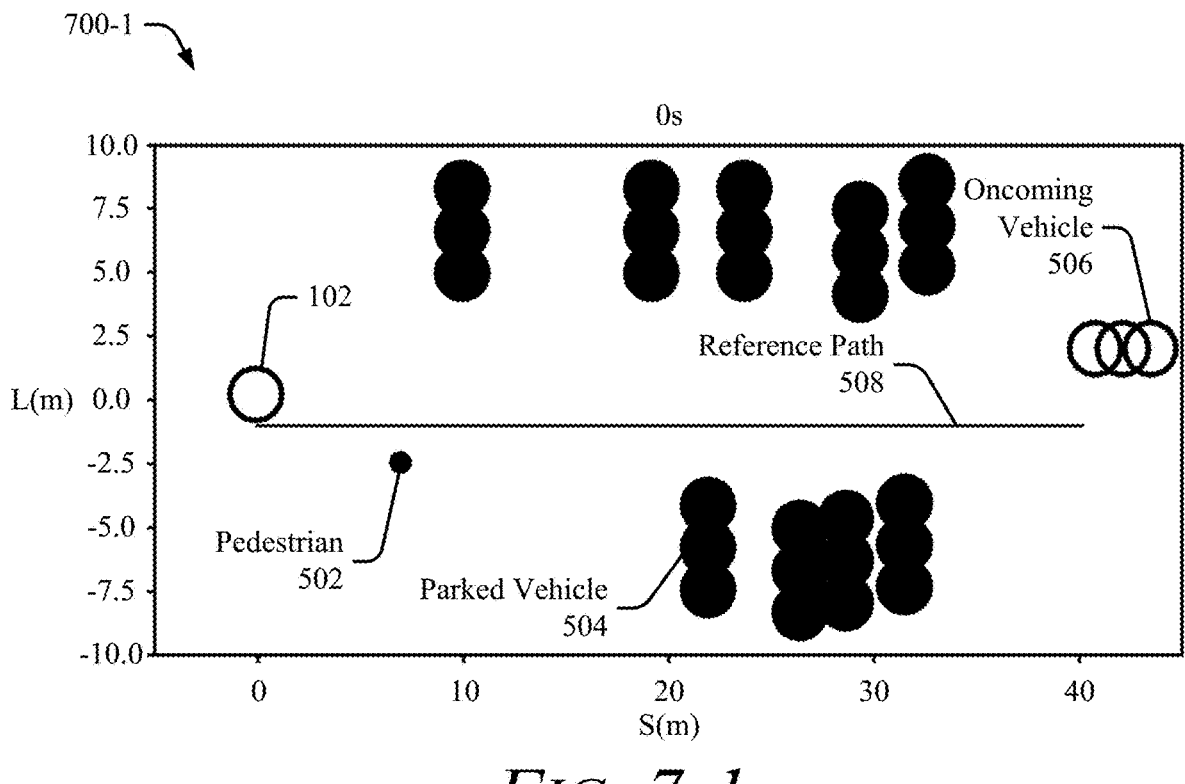
Figures 5, 7:
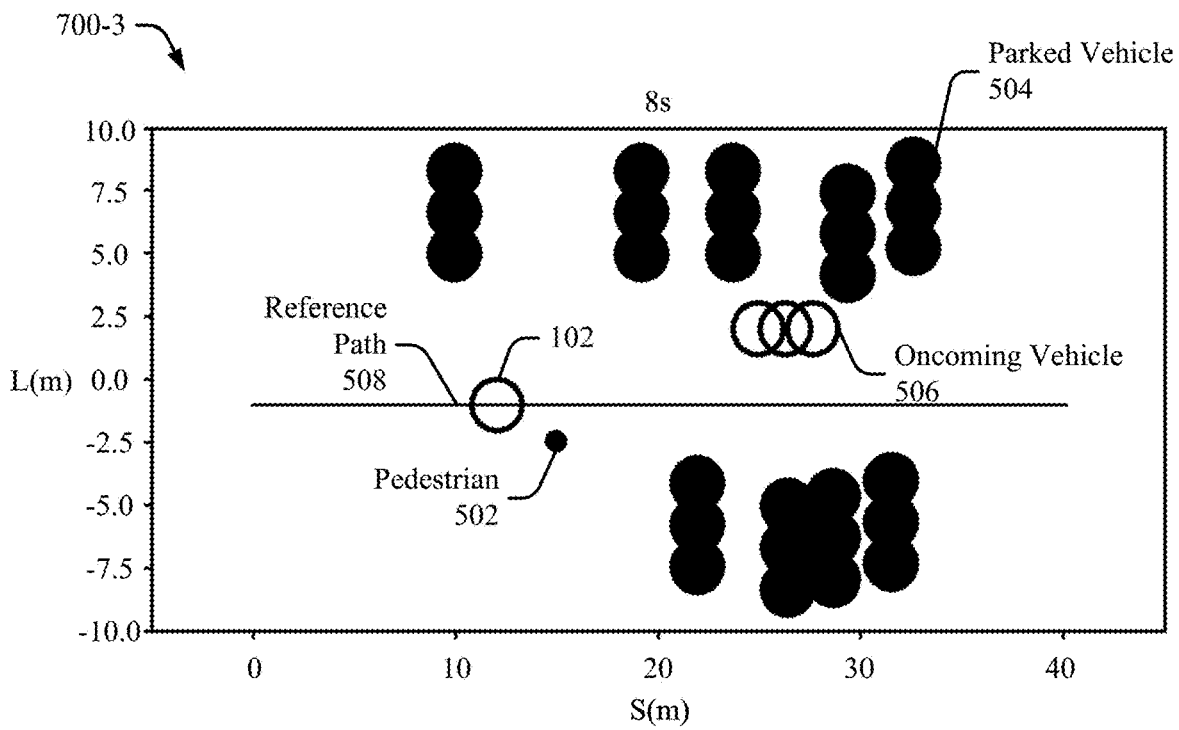
Figures 6, 7:
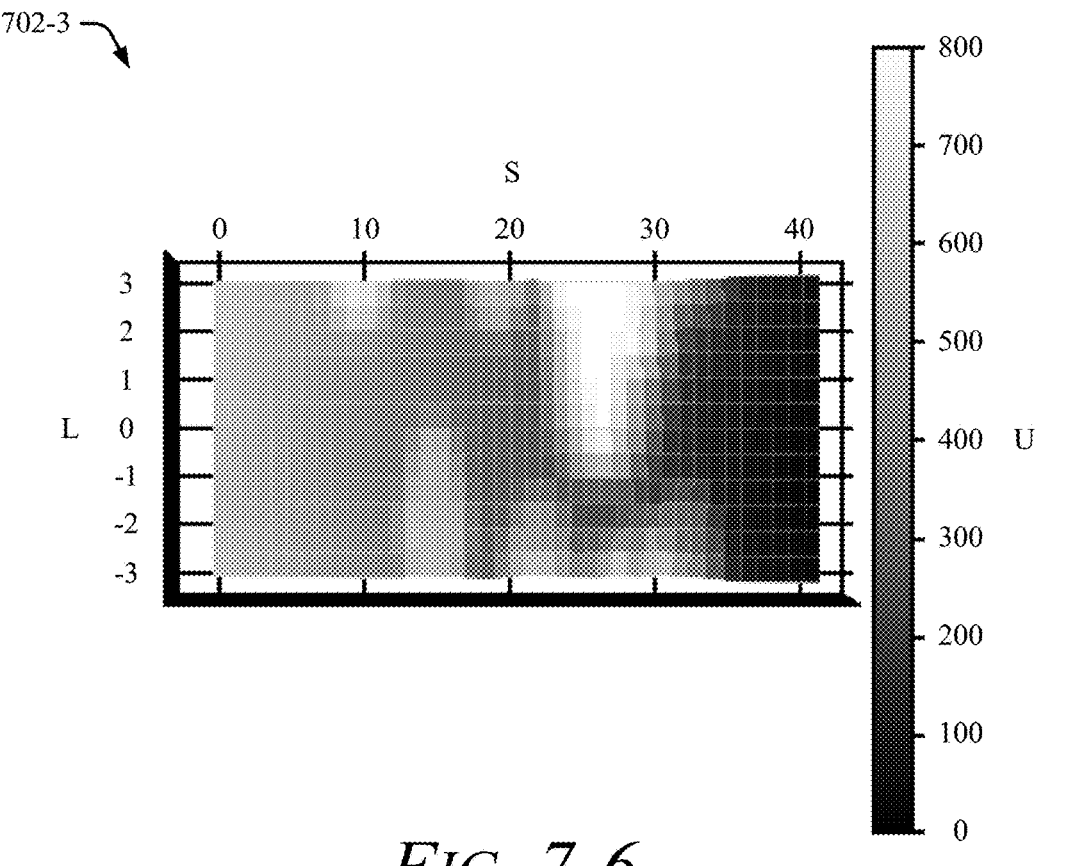

In graph 700-1 of FIG. 7-1, the vehicle 102 is traveling along the reference path 508 in the positive S direction. Graph 700-1 is taken at the outset of the trajectory with T equal to 0 seconds. The pedestrian 502 is walking in the same direction but is positioned a little to the right of the vehicle 102. The oncoming vehicle 506 is about 40 m ahead of the vehicle 102 and heading toward the vehicle. At this instant, the vehicle 102 is traveling at a set reference speed.

Graph 702-1 of FIG. 7-2 illustrates the space-time artificial potential field used by the motion planner 122 to determine the trajectory 306 at the outset of the trajectory (e.g., T=0 seconds). The lowest potential values are found along or near the reference path 508 with the pedestrian 502 causing a local maximum in the potential values near the vehicle 102.

In graphs 700-2 and 700-3 of FIG. 7-3 and FIG. 7-5, respectively, with T equal to 4 and 8 seconds, respectively, the vehicle 102 is now a short distance behind the pedestrian 502. Because the vehicle 102 cannot travel around and past the pedestrian 502 without a predicted collision with the oncoming vehicle 506, the motion planner 122 slows the vehicle 102 down while remaining centered on the reference path 508.

Graphs 702-2 and 702-3 of FIGS. 7-4 and 7-6, respectively, illustrate the space-time artificial potential field used by the motion planner 122 to determine the trajectory 306 at T equal to 4 and 8 seconds, respectively, which correspond to graphs 700-2 and 700-3 of FIGS. 7-3 and 7-5. The lowest potential values are found along or near the reference path 508 with the pedestrian 502 and the oncoming vehicle 506 causing local maxima in the potential values near the vehicle 102.

In graph 700-4 of FIG. 7-7 with T equal to 11 seconds, the vehicle 102 continues to remain a short distance behind the pedestrian 502. Because it is predicted that the vehicle 102 still cannot safely travel around and past the pedestrian 502, the motion planner 122 maintains a lower speed while remaining centered on the reference path 508.

Figures 7, 8:
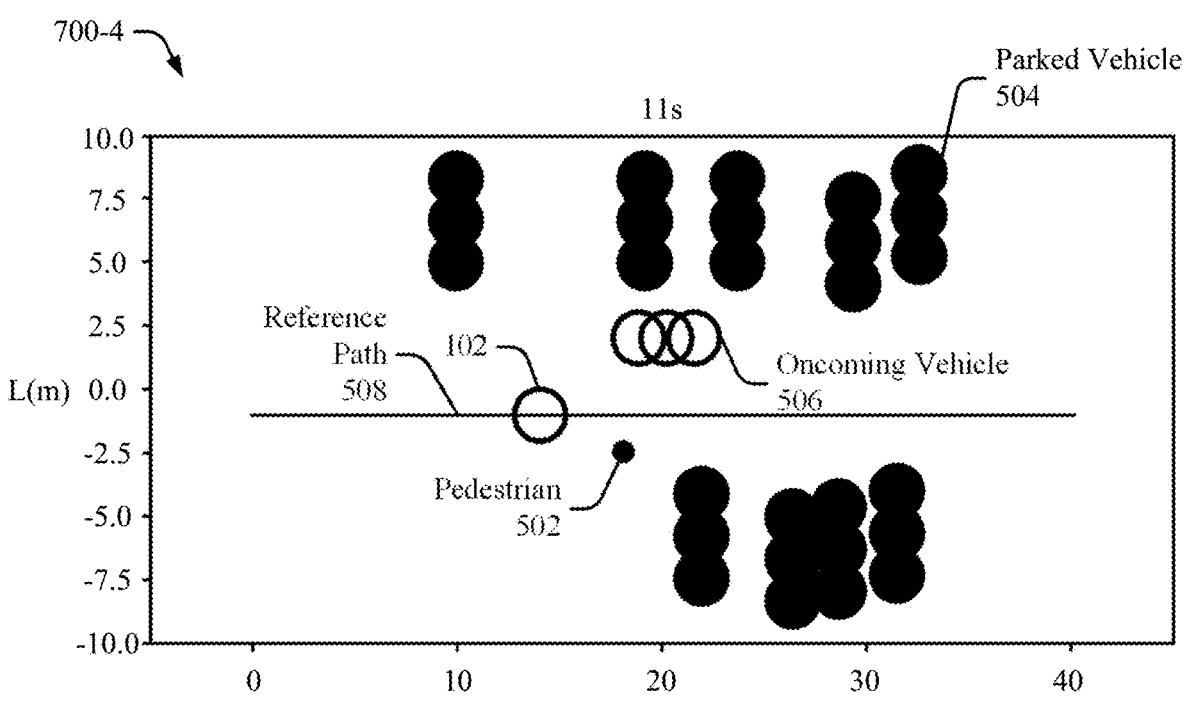

Graph 702-4 of FIG. 7-8 illustrates the space-time artificial potential field used by the motion planner 122 to determine the trajectory 306 at T equal to 11 seconds, which corresponds to graph 700-4 of FIG. 7-7. The lowest potential values are found along or near the reference path 508 with the pedestrian 502 and the oncoming vehicle 506 causing local maxima in the potential values near the vehicle 102.

Figures 7, 8, 9:
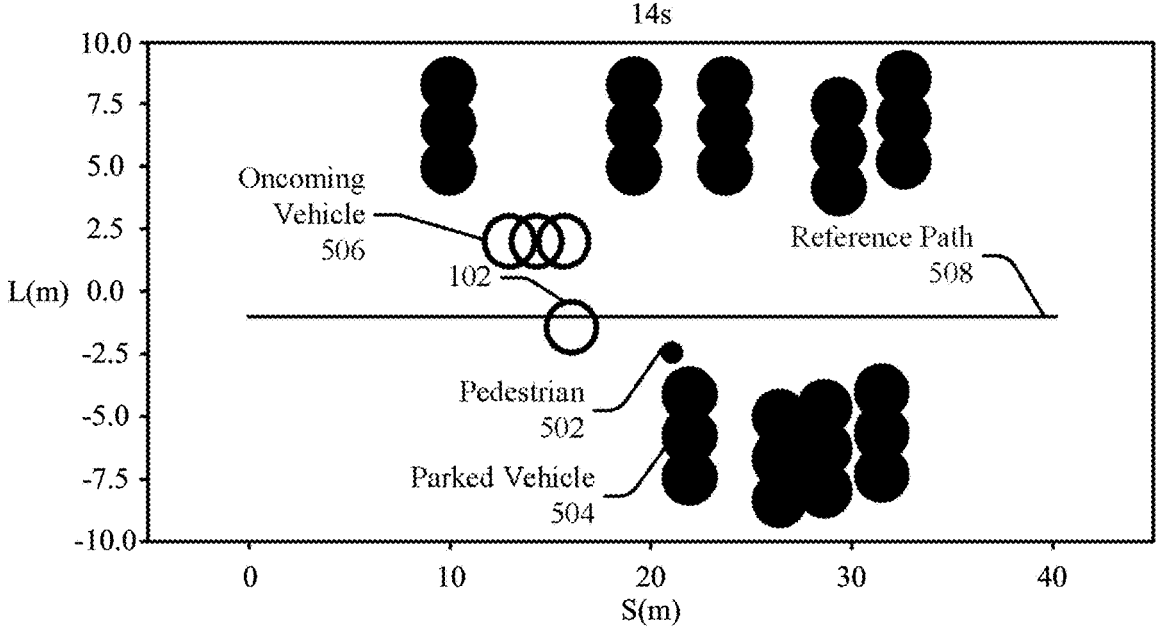
Figures 7, 8, 9, 10:
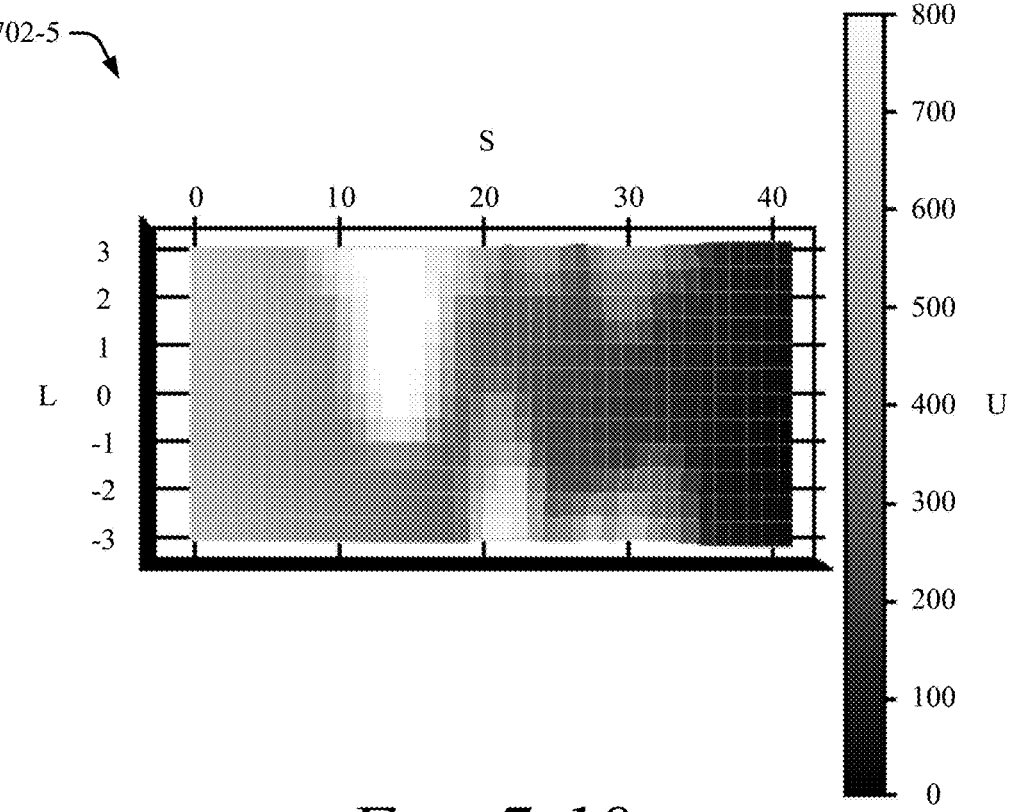
Figures 7, 8, 9, 10, 11:
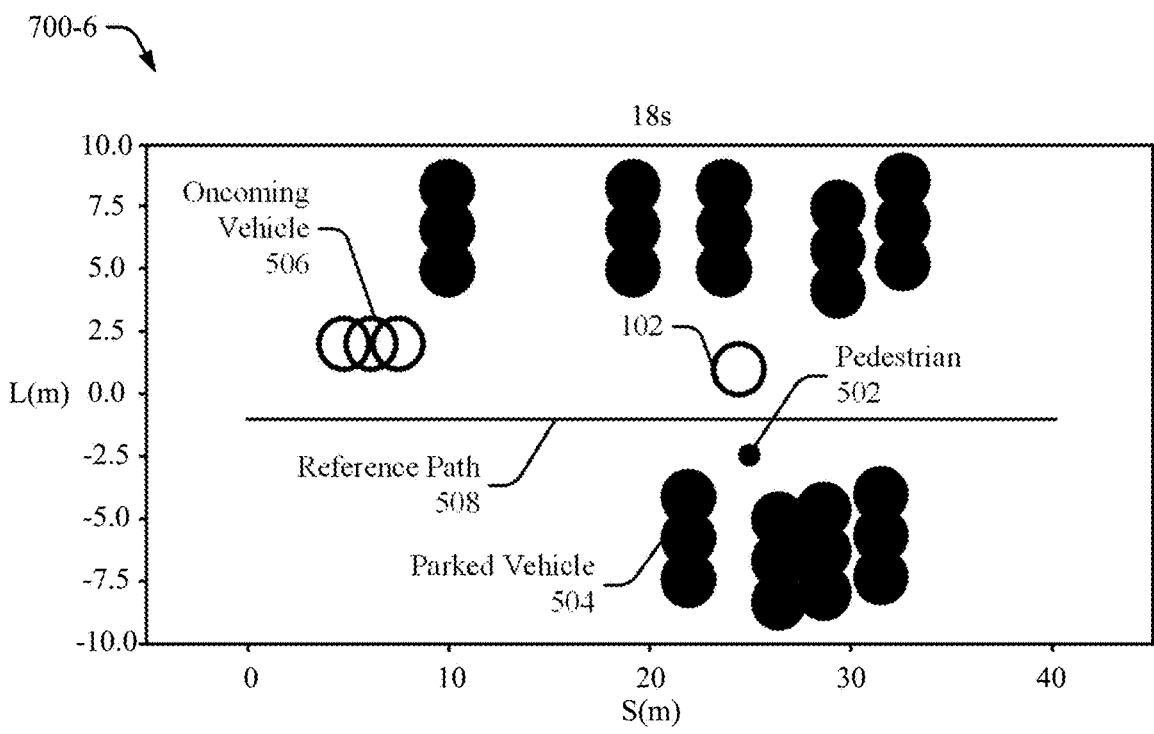
Figures 7, 8, 9, 10, 11, 12:
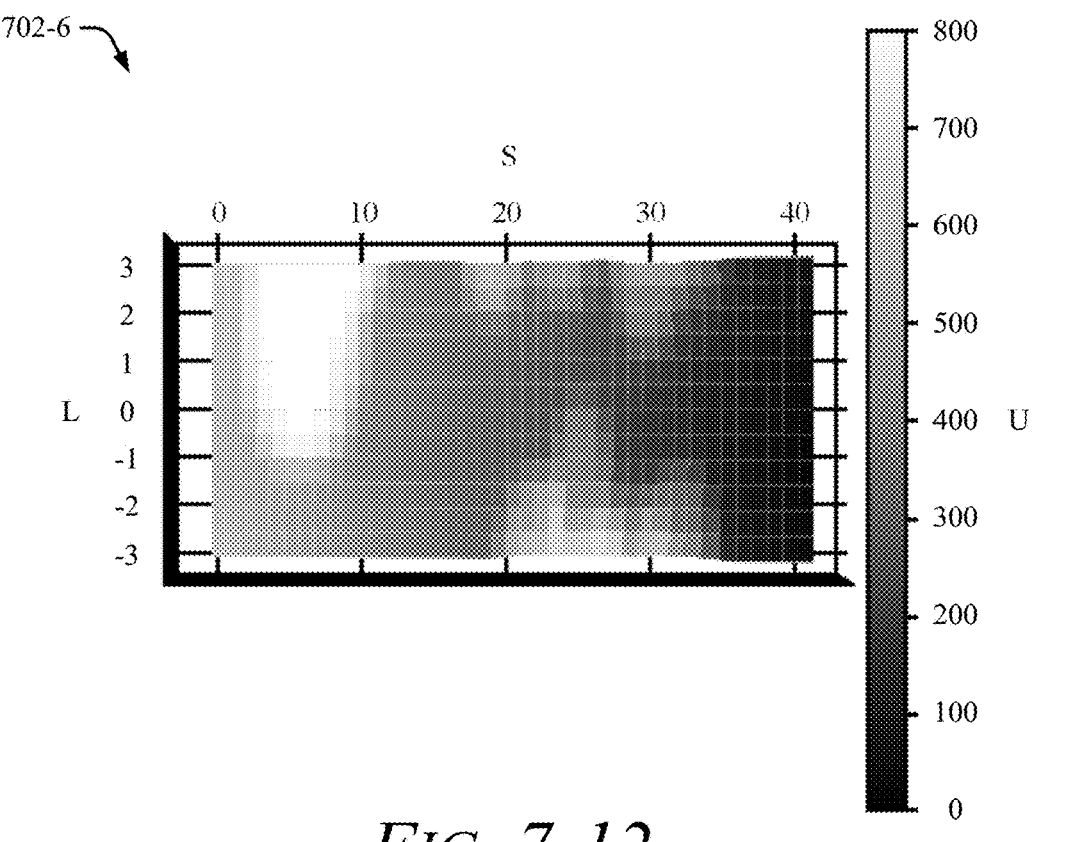

In graph 700-5 of FIG. 7-9 with T equal to 14 seconds, the vehicle 102 remains a short distance behind the pedestrian 502 as the oncoming vehicle 506 passes by it. The vehicle 102 moves laterally to the right to provide more lateral distance between it and the oncoming vehicle 506, while still maintaining the lower speed to not overtake the pedestrian 502.

Graph 702-5 of FIG. 7-10 illustrates the space-time artificial potential field used by the motion planner 122 to determine the trajectory 306 at T equal to 14 seconds, which corresponds to graph 700-5 of FIG. 7-9. The lowest potential values are found along or near the reference path 508 with the pedestrian 502 causing a local maximum in front and to the right of the vehicle 102, while the local maximum caused by the oncoming vehicle 506 is now behind the vehicle 102.

In graph 700-6 of FIG. 7-11 with T equal to 18 seconds the vehicle 102 passes the pedestrian 502. Once the oncoming vehicle 506 has safely passed the vehicle 102, the motion planner 122 initiates a passing trajectory that includes a path that passes to the left of the pedestrian 502 within the drivable aisle while also increasing its speed back up to the reference speed. In this way, the vehicle 102 safely passes the pedestrian 502.

Graph 702-6 of FIG. 7-12 illustrates the space-time artificial potential field used by the motion planner 122 to determine the trajectory 306 at T equal to 18 seconds, which corresponds to graph 700-6 of FIG. 7-11. The lowest potential values are found along or near the reference path 508 with the pedestrian 502 causing a local maximum in front and to the right of the vehicle 102, while the local maximum caused by the oncoming vehicle 506 is now behind the vehicle 102. The passing trajectory follows the maximum attractive potentials around the pedestrian 502.

In graph 700-7 of FIG. 7-13 with T equal to 26 seconds, the vehicle 102 has safely navigated the parking environment with a number of stationary and moving objects to reach its goal. The trajectory is illustrated as a B-spline 702 which is defined by a series of positional waypoints in this 2D view. For example, the vehicle 102 may now initiate a parking maneuver to park in a selected parking space. As another example, the vehicle 102 may now exit the parking environment to begin travel on a roadway.

Graph 702-7 of FIG. 7-14 illustrates the space-time artificial potential field used by the motion planner 122 to determine the trajectory 306 at T equal to 26 seconds, which corresponds to graph 700-7 of FIG. 7-13. The lowest potential values are found along the goal line.

Example Method

FIG. 8 illustrates an example method 800 of a parking system to perform trajectory planning in a 3D search space with a space-time artificial potential field. Method 800 is shown as operations (or acts) performed, but not necessarily limited to the order or combinations in which the operations are shown herein. Further, any one of one or more of the operations may be repeated, combined, or reorganized to provide other methods. In portions of the following discussion, reference may be made to environment 100 of FIG. 1, and entities detailed in FIGS. 1 through 7-12, reference to which is made for example only. The techniques are not limited to performance by one entity or multiple entities.

At step 802, an initial pose and a goal pose of a host vehicle are obtained. For example, the motion planner 122 can obtain the initial pose of vehicle 102 from a vehicle state estimator. The initial pose can be determined using location data. The initial pose may represent a source node used in a parking trajectory algorithm or graph-search based algorithm. The motion planner 122 can obtain the goal pose from the parking space selector 212 or the global planner 214. The goal pose may represent a goal node used in the parking trajectory algorithm and may indicate a location near a selected parking space, a position along a roadway in the environment, or an exit from the environment. The goal pose can be determined using location data, map data, or other sensor data (e.g., data from a camera system, a radar system, a lidar system, or an ultrasonic sensor system).

At step 804, an obstacle map for an environment that includes the initial pose and the goal pose is obtained. For example, the motion planner 122 can obtain the obstacle map from a perception system. The obstacle map can be a radar occupancy grid map or a radar-centric occupancy grid map for the environment 100. The obstacles in the obstacle map can be represented by bounding boxes, circles, occupancy grids, free-space polygons, or any combination thereof. The motion planner 122 may also obtain a reference path.

At step 806, a trajectory is determined by searching in a space-time artificial potential field. The trajectory includes a series of 3D waypoints that include 2D positional coordinates and time coordinates of the host vehicle for navigating from the initial pose toward the goal pose. For example, the motion planner 122 initially runs the parking trajectory algorithm by searching in a 3D search space with space-time artificial potential fields to obtain a series of 3D waypoints that include 2D positional coordinates (e.g., S and L coordinates) and time coordinates (e.g., T coordinates) for navigating the vehicle 102 from the initial pose toward the goal pose. The 3D search space includes a longitudinal dimension, a lateral dimension that is perpendicular to the longitudinal dimension, and a time dimension.

The motion planner 122 can use a variety of parking trajectory algorithms that are graph-search based algorithms. For example, the parking trajectory algorithm can be a variant of Hybrid A star (A*), A*, or Dijkstra algorithms for finding an optimal path from the initial pose to the goal pose using non-holonomic constraints for movement of the vehicle 102.

The parking trajectory or graph-search-based algorithm uses space-time artificial potential fields to plan the trajectory 306 that avoid collisions with stationary objects 112 and moving objects 114 in the environment 100. The space-time artificial potential fields include repulsive potential fields and attractive potential fields. A respective repulsive potential field is a function (e.g., linear, inverse, quadratic, or exponential relationship) of the distance between the vehicle 102 and a respective stationary object 112 or a respective moving object 114. An attractive potential field may include a goal potential field that is a function (e.g., linear, inverse, quadratic, or exponential relationship) of the distance between the vehicle 102 and the goal pose. The attractive potential field may also include a reference path potential field that is a function (e.g., linear, inverse, quadratic, or exponential relationship) of the lateral distance or absolute distance between the vehicle 102 and a reference path, where the lateral distance is perpendicular to the reference path.

The parking trajectory algorithm or graph-search-based algorithm may also account for or include a speed potential to penalize velocities in the parking trajectory 306 that deviate from a reference speed, exceed a maximum speed threshold, or are less than a minimum speed threshold. Similarly, a steering penalty to penalize positions in the parking trajectory 306 that require a steering angle that exceeds a steering angle threshold may be used. Trajectory optimization may also be performed on the series of 3D waypoints to smooth the positions and speeds together and reduce the curvature, acceleration or jerkiness.

At step 808, the operation of the host vehicle is controlled using an assisted-driving or an autonomous-driving system to maneuver along the trajectory to or toward the goal pose. For example, the motion planner 122 can output the trajectory 306 to the autonomous-driving system 220. The vehicle 102 can then be controlled using the autonomous-driving system 220 to navigate along the trajectory 306.

The motion planner 122 may also perform horizon planning to identify or select the first waypoints of the trajectory 306. The first waypoints include a subset of the 3D waypoints for the vehicle 102 to navigate from the initial pose toward the goal pose. This subset of waypoints may include positional coordinates and time coordinates that are included for a predetermined operation time (e.g., two seconds) or a predetermined distance (e.g., five meters) of the vehicle 102 along the trajectory 306. In response to the autonomous-driving system 220 completing operation of the vehicle 102 along the first waypoints, the motion planner 122 can identify an intermediate pose from among the subset of positional coordinates that is at an end of the first waypoints. The parking trajectory algorithm is then used to determine second waypoints of the trajectory for the vehicle 102 to navigate from the intermediate pose toward the goal node. The autonomous-driving system 220 can then control the operation of the vehicle 102 to maneuver along the second waypoints toward the goal pose.

EXAMPLES

In the following section, examples are provided.

Example 1. A method comprising: obtaining an initial pose and a goal pose of a host vehicle; obtaining an obstacle map for an environment that includes the initial pose and the goal pose; determining, using a parking trajectory algorithm and the obstacle map, a trajectory by searching in a space-time artificial potential field, the trajectory including a series of three-dimensional (3D) waypoints that includes two-dimensional (2D) positional coordinates and time coordinates of the host vehicle to navigate from the initial pose toward the goal pose; and controlling, using an assisted-driving or an autonomous-driving system, operation of the host vehicle to maneuver along the trajectory toward the goal pose.

Example 2. The method of Example 1, wherein the method further comprises: selecting first waypoints of the trajectory, the first waypoints comprising a subset of the 3D waypoints for the host vehicle to navigate from the initial pose toward the goal pose; in response to the assisted-driving or the autonomous-driving system completing operation of the host vehicle along the first waypoints, identifying an intermediate pose from among the first waypoints that is at an end of the first waypoints; determining, using the parking trajectory algorithm and the obstacle map, second waypoints of the trajectory for the host vehicle to navigate from the intermediate pose toward the goal pose; and controlling, using the assisted-driving or the autonomous-driving system, operation of the host vehicle to maneuver along the second waypoints toward the goal pose.

Example 3. The method of Example 2, wherein the subset of 3D waypoints comprises positional coordinates and time coordinates for a predetermined operation time of the host vehicle along the trajectory.

Example 4. The method of any one of the previous Examples, wherein: the environment includes one or more stationary objects and one or more moving objects; and the series of 3D waypoints for the trajectory avoids collisions between the host vehicle and the one or more stationary objects and the one or more moving objects.

Example 5. The method of Example 4, wherein: the parking trajectory algorithm comprises a graph-search based algorithm; and the graph-search based algorithm uses space-time artificial potential fields for each of the one or more stationary objects and the one or more moving objects to avoid collisions with the one or more stationary objects and the one or more moving objects in the environment.

Example 6. The method of Example 5, wherein the artificial potential fields include repulsive potential fields and at least one attractive potential field; a respective repulsive potential field is a function of a distance between the host vehicle and a respective stationary object or a respective moving object; and the at least one attractive potential field includes a goal potential field that is a function of a distance between the host vehicle and the goal pose.

Example 7. The method of Example 6, wherein the at least one attractive potential field further includes a reference path potential field that is a function of a lateral distance between the host vehicle and a reference path, the lateral distance being perpendicular to the reference path.

Example 8. The method of any one of Examples 5 through 7, wherein the graph-search based algorithm further includes at least one of: a speed potential to penalize speeds of the host vehicle in the trajectory that deviate from a reference speed, exceed a maximum speed threshold, or are less than a minimum speed threshold; or a steering penalty to penalize positional coordinates among the 3D waypoints that require a steering angle that exceeds a steering angle threshold.

Example 9. The method of any one of Examples 5 through 8, wherein the graph-search based algorithm comprises a variant of a Hybrid A star (A*), A*, or Dijkstra algorithm for finding an optimal trajectory from the initial pose to the goal pose.

Example 10. The method of any one of the preceding Examples, wherein the parking trajectory algorithm searches in a three-dimensional search space that includes a longitudinal dimension, a lateral dimension that is perpendicular to the longitudinal dimension, and a time dimension.

Example 11. The method of any one of the preceding Examples, wherein the method further comprises performing trajectory optimization on the series of 3D waypoints to smooth the series of positional coordinates and velocities together.

Example 12. The method of any one of the preceding Examples, wherein the goal pose comprises a selected parking space, a position near the selected parking space, a position along a roadway in the environment, or an exit from the environment.

Example 13. The method of any one of the preceding Examples, wherein the initial pose is generated by a vehicle state estimator using location data; the goal pose is generated by a parking spot finder using the location data and other sensor data or map data; and the other sensor data includes data from at least one of a camera system, a radar system, a lidar system, or an ultrasonic sensor system.

Example 14. A system comprising one or more processors configured to perform the method of any one of the preceding Examples.

Example 15. Computer-readable storage media comprising computer-executable instructions that, when executed, cause a processor to perform the method of any one of Examples 1 through 13.

Conclusion

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims.

What is claimed is:

1. A method comprising:

obtaining an initial pose and a goal pose of a host vehicle;

obtaining an obstacle map for an environment that includes the initial pose and the goal pose;

determining a trajectory using a parking trajectory algorithm by searching, using the obstacle map, in a three-dimensional (3D) space-time artificial potential field for a series of 3D waypoints of the trajectory, wherein the 3D waypoints include respective two-dimensional (2D) position coordinates and time coordinates of the host vehicle to navigate from the initial pose toward the goal pose, wherein the searching includes, for each of the 3D waypoints, concurrently determining a respective pair of the 2D position coordinates and a respective one of the time coordinates, wherein the parking trajectory algorithm discretizes the 3D search space into an array of 3D nodes and assigns artificial potential field values or magnitudes to each node using potential field functions and determines the 3D waypoints based on the artificial potential field values, and wherein each of the 3D nodes has respective position and time values; and controlling, using an assisted-driving or an autonomous-driving system, operation of the host vehicle to maneuver along the trajectory toward the goal pose.

2. The method of claim 1, wherein the method further comprises:

selecting first waypoints of the trajectory, the first waypoints comprising a subset of the 3D waypoints for the host vehicle to navigate from the initial pose toward the goal pose;

in response to the assisted-driving or the autonomous-driving system completing operation of the host vehicle along the first waypoints, identifying an intermediate pose from among the first waypoints that is at an end of the first waypoints;

determining, using the parking trajectory algorithm and the obstacle map, second waypoints of the trajectory for the host vehicle to navigate from the intermediate pose toward the goal pose; and controlling, using the assisted-driving or the autonomous-driving system, operation of the host vehicle to maneuver along the second waypoints toward the goal pose.

3. The method of claim 2, wherein the subset of 3D waypoints comprises positional coordinates and time coordinates for a predetermined operation time of the host vehicle along the trajectory.

4. The method of claim 1, wherein:

the environment includes one or more stationary objects and one or more moving objects; and the series of 3D waypoints for the trajectory avoids collisions between the host vehicle and the one or more stationary objects and the one or more moving objects.

5. The method of claim 4, wherein:

the parking trajectory algorithm comprises a graph-search based algorithm; and the graph-search based algorithm uses 3D space-time artificial potential fields for each of the one or more stationary objects and the one or more moving objects to avoid collisions with the one or more stationary objects and the one or more moving objects in the environment.

6. The method of claim 5, wherein:

the 3D space-time artificial potential fields for each of the one or more stationary objects include repulsive potential fields and at least one attractive potential field;

a respective repulsive potential field is a function of a distance between the host vehicle and a respective stationary object or a respective moving object; and the at least one attractive potential field includes a goal potential field that is a function of a distance between the host vehicle and the goal pose.

7. The method of claim 6, wherein the at least one attractive potential field further includes a reference path potential field that is a function of a lateral distance between the host vehicle and a reference path, the lateral distance being perpendicular to the reference path.

8. The method of claim 5, wherein the graph-search based algorithm further includes at least one of:

a speed penalty to penalize speeds of the host vehicle in the trajectory that deviate from a reference speed, exceed a maximum speed threshold, or are less than a minimum speed threshold; or a steering penalty to penalize positional coordinates among the 3D waypoints that require a steering angle that exceeds a steering angle threshold.

9. The method of claim 5, wherein the graph-search based algorithm comprises a variant of a Hybrid A star (A*), A*, or Dijkstra algorithm for finding an optimal trajectory from the initial pose to the goal pose.

10. The method of claim 1, wherein the parking trajectory algorithm searches in a three-dimensional search space that includes a longitudinal dimension, a lateral dimension that is perpendicular to the longitudinal dimension, and a time dimension.

11. The method of claim 1, wherein the method further comprises performing trajectory optimization on the series of 3D waypoints to smooth positional coordinates and velocities together.

12. The method of claim 1, wherein the goal pose comprises a selected parking space, a position near the selected parking space, a position along a roadway in the environment, or an exit from the environment.

13. The method of claim 1, wherein:

the initial pose is generated by a vehicle state estimator using location data;

the goal pose is generated by a parking spot finder using the location data and other sensor data or map data; and the other sensor data includes data from at least one of a camera system, a radar system, a lidar system, or an ultrasonic sensor system.

14. The method of claim 1, wherein the 3D space-time artificial potential field includes position coordinates and corresponding time coordinates of objects.

15. A system comprising one or more processors configured to:

obtain an initial pose and a goal pose of a host vehicle;

obtain an obstacle map for an environment that includes the initial pose and the goal pose;

determine a trajectory, using a parking trajectory algorithm by searching, using the obstacle map, in a three-dimensional (3D) space-time artificial potential field for a series of 3D waypoints of the trajectory, wherein the 3D waypoints include respective two-dimensional (2D) position coordinates and time coordinates of the host vehicle to navigate from the initial pose toward the goal pose, wherein the searching includes, for each of the 3D waypoints, concurrently determining a respective pair of the 2D position coordinates and a respective one of the time coordinates, wherein the parking trajectory algorithm discretizes the 3D search space into an array of 3D nodes and assigns artificial potential field values or magnitudes to each node using potential field functions and determines the 3D waypoints based on the artificial potential field values, and wherein each of the 3D nodes has respective position and time values; and control, using an assisted-driving or an autonomous-driving system, operation of the host vehicle to maneuver along the trajectory toward the goal pose.

16. The system of claim 15, wherein the one or more processors are further configured to:

select first waypoints of the trajectory, the first waypoints comprising a subset of the 3D waypoints for the host vehicle to navigate from the initial pose toward the goal pose;

in response to the assisted-driving or the autonomous-driving system completing operation of the host vehicle along the first waypoints, identify an intermediate pose from among the first waypoints that is at an end of the first waypoints;

determine, using the parking trajectory algorithm and the obstacle map, second waypoints of the trajectory for the host vehicle to navigate from the intermediate pose toward the goal pose; and control, using the assisted-driving or the autonomous-driving system, operation of the host vehicle to maneuver along the second waypoints toward the goal pose.

17. The system of claim 16, wherein the subset of 3D waypoints comprises positional coordinates and time coordinates for a predetermined operation time of the host vehicle along the trajectory.

18. The system of claim 15, wherein the parking trajectory algorithm searches in a three-dimensional search space that includes a longitudinal dimension, a lateral dimension that is perpendicular to the longitudinal dimension, and a time dimension.

19. The system of claim 15, wherein:

the environment includes one or more stationary objects and one or more moving objects;

the series of 3D waypoints for the trajectory avoids collisions between the host vehicle and the one or more stationary objects and the one or more moving objects;

the parking trajectory algorithm comprises a graph-search based algorithm; and the graph-search based algorithm uses space-time artificial potential fields for each of the one or more stationary objects and the one or more moving objects to avoid collisions with the one or more stationary objects and the one or more moving objects in the environment.

20. The system of claim 19, wherein:

the space-time artificial potential fields for each of the one or more stationary objects include repulsive potential fields and at least one attractive potential field;

a respective repulsive potential field is a function of a distance between the host vehicle and a respective stationary object or a respective moving object; and the at least one attractive potential field includes a goal potential field that is a function of a distance between the host vehicle and the goal pose.

21. Non-transitory computer readable storage media comprising computer-executable instructions that, when executed, cause a processor to:

obtain an initial pose and a goal pose of a host vehicle;

obtain an obstacle map for an environment that includes the initial pose and the goal pose;

determine a trajectory using a parking trajectory algorithm by searching, using the obstacle map, in a three-dimensional (3D) space-time artificial potential field for a series of 3D waypoints of the trajectory, wherein the 3D waypoints include respective two-dimensional (2D) position coordinates and time coordinates of the host vehicle to navigate from the initial pose toward the goal pose, wherein the searching includes, for each of the 3D waypoints, concurrently determining a respective pair of the 2D position coordinates and a respective one of the time coordinates, wherein the parking trajectory algorithm discretizes the 3D search space into an array of 3D nodes and assigns artificial potential field values or magnitudes to each node using potential field functions and determines the 3D waypoints based on the artificial potential field values, and wherein each of the 3D nodes has respective position and time values; and control, using an assisted-driving or an autonomous-driving system, operation of the host vehicle to maneuver along the trajectory toward the goal pose.

* * * * *